(12) United States Patent
Cheng et al.

(10) Patent No.: US 11,923,693 B2
(45) Date of Patent: Mar. 5, 2024

(54) WIRELESS POWER SUPPLY APPARATUS AND WIRELESS POWER RECEIVING TERMINAL

(71) Applicant: Huawei Digital Power Technologies Co., Ltd., Shenzhen (CN)

(72) Inventors: Yuan Cheng, Dongguan (CN); Wei Shui, Dongguan (CN)

(73) Assignee: HUAWEI DIGITAL POWER TECHNOLOGIES CO., LTD., Shenzhen (CN)

(*) Notice: Subject to any disclaimer, the term of this patent is extended or adjusted under 35 U.S.C. 154(b) by 130 days.

(21) Appl. No.: 17/726,761

(22) Filed: Apr. 22, 2022

(65) Prior Publication Data

US 2022/0247226 A1 Aug. 4, 2022

Related U.S. Application Data

(63) Continuation of application No. PCT/CN2020/118728, filed on Sep. 29, 2020.

(51) Int. Cl.
| | |
|---|---|
| *H02J 50/23* | (2016.01) |
| *H02J 50/40* | (2016.01) |
| *H02J 50/80* | (2016.01) |
| *H02J 50/90* | (2016.01) |
| *H04B 7/06* | (2006.01) |

(52) U.S. Cl.
CPC ............ *H02J 50/23* (2016.02); *H02J 50/40* (2016.02); *H02J 50/80* (2016.02); *H02J 50/90* (2016.02); *H04B 7/0617* (2013.01)

(58) Field of Classification Search
CPC ....................................................... H02J 50/23
USPC ......................................................... 307/104
See application file for complete search history.

(56) References Cited

U.S. PATENT DOCUMENTS

| | | | |
|---|---|---|---|
| 9,899,861 B1 | 2/2018 | Leabman et al. | |
| 10,008,875 B1* | 6/2018 | Leabman | ............... H02J 50/80 |
| 10,177,607 B2 | 1/2019 | Zeine et al. | |
| 2014/0375261 A1 | 12/2014 | Manova-Elssibony et al. | |
| 2016/0049823 A1 | 2/2016 | Stein et al. | |
| 2016/0211705 A1 | 7/2016 | Moshfeghi | |
| 2017/0085127 A1 | 3/2017 | Leabman | |
| 2018/0006508 A1 | 1/2018 | Jeki et al. | |
| 2018/0183259 A1* | 6/2018 | Lee | ........................ H02J 50/90 |
| 2019/0157912 A1 | 5/2019 | Taniguchi et al. | |

(Continued)

FOREIGN PATENT DOCUMENTS

| | | |
|---|---|---|
| CN | 202524174 U | 11/2012 |
| CN | 103441583 A | 12/2013 |
| CN | 107112800 A | 8/2017 |

(Continued)

*Primary Examiner* — Joseph Chang
(74) *Attorney, Agent, or Firm* — Conley Rose, P.C.

(57) ABSTRACT

A wireless power supply apparatus includes a controller, a beamforming module, and an antenna array. When direction finding information is obtained, the controller determines an electromagnetic wave transmission direction, and transmits information about the transmission direction to the beamforming module. The beamforming module aggregates energy of electromagnetic waves corresponding to a plurality of radio frequency signals to the transmission direction. The antenna array receives the direction finding information, and transmits the electromagnetic waves.

20 Claims, 13 Drawing Sheets

(56) References Cited

U.S. PATENT DOCUMENTS

2019/0312465 A1 10/2019 Yeo et al.
2020/0067341 A1 2/2020 Glover et al.

FOREIGN PATENT DOCUMENTS

| CN | 107482799 A | 12/2017 |
| CN | 108054841 A | 5/2018 |
| CN | 108336770 A | 7/2018 |
| CN | 108767954 A | 11/2018 |
| CN | 109245221 A | 1/2019 |
| CN | 110414289 A | 11/2019 |
| CN | 110429723 A | 11/2019 |
| CN | 111245110 A | 6/2020 |

* cited by examiner

WIRELESS POWER SUPPLY APPARATUS AND WIRELESS POWER RECEIVING TERMINAL

CROSS-REFERENCE TO RELATED APPLICATIONS

This application is a continuation application of International Patent Application No. PCT/CN2020/118728, filed on Sep. 29, 2020, which is hereby incorporated by reference in its entirety.

TECHNICAL FIELD

This application relates to the field of wireless power supply technologies, and in particular, to a wireless power supply apparatus, a wireless power receiving terminal, a transmission method, a power supply method, and a wireless power supply system.

BACKGROUND

Sensor devices are used in smart household, industrial sensor monitoring, and other scenarios. These sensor devices all require power supply and communication. To reduce the workload of cabling, the communication with the sensor devices is basically performed wirelessly. However, most of the power supply is still performed by using a battery.

The power supply performed by using a battery is limited by a use scenario. For example, in a high-temperature scenario or a low-temperature scenario, power supply performance of the battery is limited, and the battery needs to be replaced after power is exhausted. With the increasingly popularized application of sensor devices, wireless power supply for the sensor devices is increasingly demanded.

The wireless power supply means that a wireless power supply apparatus focuses energy by using a beamforming technology, so that electromagnetic wave energy propagates to a direction in which a wireless power receiving terminal is located, and the wireless power receiving terminal receives the electromagnetic wave energy, to implement charging.

In an existing wireless power supply system, when power is supplied to a sensor device, it is necessary to manually measure a direction of the sensor device, that is, a direction of a wireless power receiving terminal, and then inform a wireless power supply apparatus through manual input or wireless communication, so that the wireless power supply apparatus can concentrate energy of transmitted electromagnetic waves in a direction in which the wireless power receiving terminal is located. Therefore, an accurate manual measurement operation is required, or otherwise, efficiency of wireless power supply is greatly reduced. In addition, after the direction of the wireless power receiving terminal relative to the wireless power supply apparatus changes, re-measurement is required. Therefore, deployment is inconvenient.

SUMMARY

This application provides a wireless power supply apparatus and a wireless power receiving terminal, to automatically determine a direction of the wireless power receiving terminal relative to the wireless power supply apparatus, so as to improve efficiency of power supply for the wireless power receiving terminal, thereby avoiding a manual measurement operation, and facilitating deployment.

According to a first aspect, this application provides a wireless power supply apparatus, to perform non-contact wireless power supply for a wireless power receiving terminal. The wireless power supply apparatus includes a controller, a beamforming module, and an antenna array. The controller determines an electromagnetic wave transmission direction based on direction finding information, and transmits information about the transmission direction to the beamforming module. The beamforming module aggregates energy of electromagnetic waves corresponding to a plurality of radio frequency signals to the transmission direction. The antenna array is configured to receive the direction finding information, and transmit the electromagnetic waves in the transmission direction.

The wireless power supply apparatus provided in this application has a direction finding function. When the direction finding information sent by the wireless power receiving terminal is obtained, the controller determines the electromagnetic wave transmission direction. The transmission direction represents a direction of the wireless power receiving terminal (also referred to as a terminal below) relative to the wireless power supply apparatus (also referred to as an apparatus below). After the direction of the terminal relative to the apparatus changes, the apparatus may re-determine the direction, to adjust the electromagnetic wave transmission direction, so as to improve efficiency of wireless power supply for the terminal, thereby avoiding a manual measurement operation, and facilitating deployment. In addition, the controller of the apparatus may further determine directions of a plurality of terminals, so that the beamforming module concentrates the energy of the electromagnetic waves corresponding to the plurality of radio frequency signals to a plurality of transmission directions, that is, the apparatus further supports simultaneous power supply for the plurality of terminals.

With reference to the first aspect, in a first possible implementation, the controller determines the transmission direction based on phase information and wavelength information that are determined by the direction finding information and a relative position relationship between antennas included in the antenna array. The controller may determine the relative direction of the terminal based on an angle-of-arrival (AoA) direction finding technology. The relative position relationship between the antennas includes a distance between the antennas and a relative direction between the antennas.

With reference to the first aspect, in a second possible implementation, the wireless power supply apparatus further includes a direction finding module and a radio frequency switching module. The controller is configured to control the radio frequency switching module to be in a signal transmission state, so that the direction finding module receives a direction finding signal; and control, after determining the transmission direction, the radio frequency switching module to switch to a power transmission state, so that the beamforming module transmits the electromagnetic waves by using the antenna array. The direction finding module is configured to obtain the direction finding information in the direction finding signal, and transmit the direction finding information to the controller. The controller may switch a working state of the radio frequency switching module by changing a working state of a control switch.

With reference to the first aspect, in a third possible implementation, the controller is further configured to control, after determining the transmission direction, the apparatus to send a response signal to the terminal. After the terminal receives the response signal, it indicates that the apparatus currently has determined the transmission direction. Therefore, the terminal may stop further sending the direction finding signal. That is, the response signal may be used as a feedback signal of the apparatus to the terminal. In some embodiments, as a feedback signal, the response signal may further indicate an antenna of the terminal to switch a working state.

With reference to the first aspect, in a fourth possible implementation, the controller is further configured to control, before the transmission direction is determined, the apparatus to transmit electromagnetic waves at different azimuth angles and elevation angles. That is, the controller controls the apparatus to transmit electromagnetic waves through blind sweep, to provide electric energy required for power-on of the terminal.

With reference to the first aspect, in a fifth possible implementation, the wireless power supply apparatus uses a short-range wireless communications technology.

With reference to the first aspect, in a sixth possible implementation, the short-range wireless communications technology may be one of BLUETOOTH, wireless fidelity (WIFI), ultra-wideband (UWB), radio frequency identification (RFID) technology, a Zigbee protocol (ZIGBEE), a home Internet of things communications protocol technology Thread, Sub 1 Gigahertz (Sub-1G), and the like.

With reference to the first aspect, in a seventh possible implementation, the antenna array uses single-band antennas, and the antenna array includes a first antenna element and a second antenna element. The first antenna element is configured to perform data communication with the terminal and trigger, when receiving the direction finding signal, the second antenna element to start to receive the direction finding signal. The second antenna element is an antenna array, and is configured to receive the direction finding signal and transmit the electromagnetic waves.

In the antenna array, an antenna for data communication and an antenna for power transmission are combined to form an array, thereby improving integration of the antenna array.

With reference to the first aspect, in an eighth possible implementation, the antennas included in the antenna array are multi-band antennas. In this case, different frequency bands are respectively used for data communication, direction finding, and power supply (that is, power transmission). Because data communication and signal-based direction finding functions are not affected when the multi-band antenna transmits energy, in this case, the antenna array may not include the first antenna element separately disposed, and functions of the first antenna element may be implemented by the second antenna element.

According to a second aspect, this application further provides a wireless power receiving terminal. The wireless power receiving terminal includes an antenna, an energy collection module, and a controller. The controller is configured to control the antenna to send direction finding information. The antenna is configured to send the direction finding information, and transmit energy of received electromagnetic waves to the energy collection module. The energy collection module is configured to collect and store the energy of the electromagnetic waves.

The terminal transmits the direction finding information to a wireless power supply apparatus, so that the wireless power supply apparatus determines an electromagnetic wave transmission direction by using the direction finding information.

With reference to the second aspect, in a first possible implementation, the controller is further configured to control the wireless power receiving terminal to send a direction finding signal based on a preset period.

In this case, the direction finding signal can further enable the wireless power supply apparatus to periodically obtain a status of the terminal, for example, determine whether the terminal normally performs communication connection. In addition, a controller of the apparatus may be further enabled to periodically perform direction finding and positioning, to adjust or calibrate a direction of the terminal relative to the apparatus, so as to improve efficiency of wireless power supply for the terminal.

With reference to the second aspect, in a second possible implementation, the terminal further includes a radio frequency module. The radio frequency module is configured to send the direction finding signal by using the antenna.

With reference to the second aspect, in a third possible implementation, the terminal uses a short-range wireless communications technology.

With reference to the second aspect, in a fourth possible implementation, the short-range wireless communications technology is any one of BLUETOOTH, WIFI, UWB, RFID, a ZIGBEE protocol, a home Internet of things communications protocol technology Thread, and Sub-1G.

With reference to the second aspect, in a fifth possible implementation, the antenna is a single-band antenna, a frequency band is shared by data communication, direction finding, and power supply (power transmission), and the antenna includes a third antenna element and a fourth antenna element. The third antenna element is configured to perform data communication with the apparatus and send the direction finding signal. The fourth antenna element is configured to transmit, to the energy collection module, the energy of the electromagnetic waves transmitted by the apparatus.

With reference to the second aspect, in a sixth possible implementation, the controller is further configured to control the antenna to be in a data transmission state, so that the antenna sends the direction finding signal; and control the antenna to be in a power receiving state, so that the antenna transmits, to the energy collection module, the energy of the electromagnetic waves transmitted by the apparatus.

With reference to the second aspect, in a seventh possible implementation, the antenna is a multi-band antenna. In this case, different frequency bands are used by the antenna to perform data communication and electromagnetic wave energy receiving. Therefore, the antenna may be one antenna.

With reference to the second aspect, in an eighth possible implementation, the wireless power receiving terminal is a sensor device, and the wireless power receiving terminal further includes a sensor module. The energy collection module is configured to supply power to the sensor module.

According to a third aspect, this application further provides a wireless power supply apparatus, including a controller, a beamforming module, and an antenna array. The controller is configured to control the wireless power supply apparatus to send direction finding information, and when direction information is obtained, determine an electromagnetic wave transmission direction by using the direction information, and transmit information about the transmission direction to the beamforming module. The direction information represents a relative position relationship between a terminal and the apparatus. The beamforming module is configured to generate a plurality of radio frequency signals, and aggregate energy of electromagnetic waves corresponding to the plurality of radio frequency signals to the transmission direction. The antenna array is configured to send the direction finding information, receive the direction information, and transmit the electromagnetic waves in the transmission direction.

In this case, the wireless power receiving terminal has a direction finding function. The terminal may determine the direction information representing the relative position relationship between the terminal and the apparatus, and send the direction information to the apparatus, so that the apparatus determines the electromagnetic wave transmission direction by using the direction information. After a direction of the terminal relative to the apparatus changes, the terminal may re-determine the direction, so that the apparatus can correspondingly re-determine the electromagnetic wave transmission direction, to improve efficiency of wireless power supply of the apparatus, thereby avoiding a manual measurement operation, and facilitating deployment. In addition, when the controller of the apparatus determines that there are a plurality of transmission directions, the beamforming module may further concentrate the energy of the electromagnetic waves corresponding to the plurality of radio frequency signals to the plurality of transmission directions, that is, the apparatus further supports simultaneous power supply for a plurality of terminals.

With reference to the third aspect, in a first possible implementation, the controller is further configured to control, after determining the transmission direction, the apparatus to send a response signal to the terminal, so that after receiving the response signal, the terminal determines that the apparatus currently has obtained the direction information. Therefore, the terminal may stop further sending a direction finding signal. That is, the response signal may be used as a feedback signal of the apparatus to the terminal. In some embodiments, as a feedback signal, the response signal may further indicate an antenna of the terminal to switch a working state.

With reference to the third aspect, in a second possible implementation, the controller is further configured to control, before the transmission direction is known, the apparatus to transmit electromagnetic waves at different azimuth angles and elevation angles. That is, the controller controls the apparatus to transmit electromagnetic waves through blind sweep, to provide electric energy required for power-on of the terminal.

With reference to the third aspect, in a third possible implementation, the controller is further configured to control the wireless power supply apparatus to send a direction finding signal based on a preset period, so that a controller of the terminal periodically performs direction finding and positioning, to adjust or calibrate the direction of the terminal relative to the apparatus, so as to improve efficiency of wireless power supply for the terminal.

With reference to the third aspect, in a fourth possible implementation, the wireless power supply apparatus uses a short-range wireless communications technology.

With reference to the third aspect, in a fifth possible implementation, the short-range wireless communications technology is any one of BLUETOOTH, WIFI, UWB, RFID technology, a ZIGBEE protocol, a home Internet of things communications protocol technology thread, and Sub-1G.

With reference to the third aspect, in a sixth possible implementation, the antenna array uses single-band antennas, that is, a frequency band is shared by data communication and power supply, and the antenna array includes a first antenna element and a second antenna element. The first antenna element is configured to perform data communication with the terminal, send the direction finding signal, and receive a power supply request signal. The second antenna element is an antenna array, and is configured to send the direction finding signal and transmit the electromagnetic waves.

In the antenna array, an antenna for data communication and an antenna for power transmission are combined to form an array, thereby improving integration of the antenna array.

With reference to the third aspect, in a seventh possible implementation, the antenna array is a multi-band antenna array. In this case, different frequency bands are respectively used for data communication, direction finding, and power supply (that is, power transmission). Because data communication and signal-based direction finding functions are not affected when a multi-band antenna transmits energy, the multi-band antenna array may not include the first antenna element separately disposed, and functions of the first antenna element may be implemented by the second antenna element.

According to a fourth aspect, this application further provides a wireless power receiving terminal. The terminal includes an antenna, an energy collection module, and a controller. The controller is configured to determine direction information by using direction finding information, and control the terminal to send the direction information to an apparatus. The direction information represents a relative position relationship between the terminal and the apparatus. The antenna is configured to receive the direction finding information, send the direction information, and transmit energy of received electromagnetic waves to the energy collection module. The energy collection module is configured to collect and store the energy of the electromagnetic waves.

After a direction of the terminal relative to the apparatus changes, the terminal may re-determine the direction, so that the apparatus can correspondingly re-determine an electromagnetic wave transmission direction, to improve efficiency of wireless power supply of the apparatus, thereby avoiding a manual measurement operation, and facilitating deployment.

With reference to the fourth aspect, in a first possible implementation, the controller of the terminal determines the direction information by using an angle-of-departure (AoD) direction finding technology. In an example, the controller determines the direction information based on phase information and wavelength information that are determined by the direction finding information and a relative position relationship between antennas included in an antenna array of the wireless power supply apparatus.

With reference to the fourth aspect, in a second possible implementation, the terminal further includes a direction finding module and a radio frequency module. The radio frequency module is configured to transmit a direction finding signal to the direction finding module, and send a power supply request signal by using the antenna. The direction finding module is configured to obtain the direction finding information in the direction finding signal, and transmit the direction finding information to the controller of the terminal.

With reference to the fourth aspect, in a third possible implementation, the terminal uses a short-range wireless communications technology.

With reference to the fourth aspect, in a fourth possible implementation, the short-range wireless communications technology is any one of BLUETOOTH, WIFI, UWB, RFID technology, a ZIGBEE protocol, a home Internet of things communications protocol technology Thread, and Sub-1G.

With reference to the fourth aspect, in a fifth possible implementation, the antenna is a single-band antenna, and the antenna includes a third antenna element and a fourth antenna element. The third antenna element is configured to perform data communication with the apparatus, receive the direction finding signal, and send the power supply request signal. The fourth antenna element is configured to transmit, to the energy collection module, the energy of the electromagnetic waves transmitted by the apparatus.

With reference to the fourth aspect, in a sixth possible implementation, the controller of the terminal is further configured to control the antenna to be in a data transmission state, so that the antenna receives the direction finding signal and sends the power supply request signal; and after a response signal transmitted by the apparatus is received, control the antenna to be in a power receiving state, so that the antenna transmits, to the energy collection module, the energy of the electromagnetic waves transmitted by the apparatus. The controller of the terminal switches a working state of the antenna in a time division multiplexing manner. In this case, the antenna may be a separate antenna.

With reference to the fourth aspect, in a seventh possible implementation, the antenna is a multi-band antenna. In this case, different frequency bands are respectively used for data communication, direction finding, and power supply (that is, power transmission). Because data communication and signal-based direction finding functions are not affected when the multi-band antenna transmits energy, the antenna may be a separate antenna.

With reference to the forth aspect, in an eighth possible implementation, the wireless power receiving terminal is a sensor device, and the wireless power receiving terminal further includes a sensor module. The energy collection module is configured to supply power to the sensor module.

According to a fifth aspect, this application further provides a control method for a wireless power supply apparatus. The method includes the following steps, such as, determining an electromagnetic wave transmission direction based on direction finding information; aggregating energy of electromagnetic waves corresponding to a plurality of radio frequency signals to the transmission direction; and transmitting the electromagnetic waves in the transmission direction.

With reference to the fifth aspect, in a first possible implementation, the determining an electromagnetic wave transmission direction includes determining the transmission direction based on phase information and wavelength information that are determined by the direction finding information and a relative position relationship between antennas included in an antenna array of the apparatus.

With reference to the fifth aspect, in a second possible implementation, the method further includes, after determining the transmission direction, sending a response signal to a terminal. The response signal is used as a feedback signal of the apparatus.

When an antenna of the terminal uses a single-band antenna, after receiving the response signal, the terminal controls the antenna to switch from a data transmission state to a power receiving state.

With reference to the fifth aspect, in a third possible implementation, the method further includes, before the transmission direction is determined, transmitting electromagnetic waves at different azimuth angles and elevation angles, so that the apparatus sweeps within power supply coverage of the apparatus, to provide electric energy required for power-on of the terminal.

According to a sixth aspect, this application further provides a control method for a wireless power receiving terminal. The method includes the following steps such as sending direction finding information; and collecting and storing energy of received electromagnetic waves.

With reference to the sixth aspect, in a first possible implementation, the sending direction finding information includes sending the direction finding information based on a preset period.

A function of the direction finding information is to enable an apparatus to periodically obtain a status of the terminal, for example, determine whether the terminal normally performs communication connection. In addition, a controller of the apparatus may be further enabled to periodically perform direction finding and positioning, to adjust or calibrate a direction of the terminal relative to the apparatus, so as to improve efficiency of wireless power supply for the terminal.

According to a seventh aspect, this application further provides another control method for a wireless power supply apparatus. The method includes the following steps such as sending direction finding information, and obtaining direction information sent by a terminal, where the direction information represents a relative position relationship between the terminal and the apparatus; determining an electromagnetic wave transmission direction by using the direction information; aggregating energy of electromagnetic waves corresponding to a plurality of radio frequency signals to the transmission direction; and transmitting the electromagnetic waves in the transmission direction.

With reference to the seventh aspect, in a first possible implementation, the method further includes, after determining the transmission direction, sending a response signal to the terminal.

The response signal is used as a feedback signal of the apparatus. When an antenna of the terminal uses a single-band antenna, after receiving the response signal, the terminal controls the antenna of the terminal to switch from a data transmission state to a power receiving state.

With reference to the seventh aspect, in a second possible implementation, the sending direction finding information includes sending the direction finding information based on a preset period, so that a controller of the terminal periodically performs direction finding and positioning, to adjust or calibrate a direction of the terminal relative to the apparatus, so as to improve efficiency of wireless power supply for the terminal.

With reference to the seventh aspect, in a third possible implementation, the method further includes, before the transmission direction is determined, transmitting electromagnetic waves at different azimuth angles and elevation angles.

That is, the apparatus is controlled to transmit electromagnetic waves at different azimuth angles and elevation angles, to sweep within power supply coverage of the apparatus, so as to provide electric energy required for power-on of the terminal.

According to an eighth aspect, this application further provides another control method for a wireless power receiving terminal. The method includes the following steps such as determining direction information by using direction finding information, and sending the direction information to a wireless power supply apparatus, where the direction information represents a relative position relationship between the terminal and the apparatus; and collecting and storing energy of received electromagnetic waves.

With reference to the eighth aspect, in a first possible implementation, the determining direction information by using direction finding information includes determining the direction information based on phase information and wavelength information that are determined by the direction finding information and a relative position relationship between antennas included in an antenna array of the wireless power supply apparatus; and sending the direction information to the apparatus.

According to a ninth aspect, this application further provides a wireless power supply system. The wireless power supply system includes the wireless power supply apparatus provided in the first aspect and at least one wireless power receiving terminal provided in the second aspect, or includes the wireless power supply apparatus provided in the third aspect and at least one wireless power receiving terminal provided in the fourth aspect.

According to a tenth aspect, this application further provides a power supply device. The power supply device includes the wireless power supply apparatus provided in the first aspect or the wireless power supply apparatus provided in the third aspect, and the power supply device supports simultaneous power supply for a plurality of wireless power receiving terminals. The power supply device may be mounted in a plurality of manners, for example, ceiling mounting and wall mounting. This is not limited in this embodiment of this application.

According to an eleventh aspect, this application further provides a power receiving device. The power receiving device includes the wireless power receiving terminal provided in the second aspect or the wireless power receiving terminal provided in the fourth aspect.

With reference to the eleventh aspect, in a first possible implementation, the power receiving device is a sensor device, and the power receiving device includes a sensor module. The energy collection module of the terminal is configured to supply power to the sensor module. The sensor device may be a temperature sensor, a humidity sensor, a water leakage sensor, a door status sensor, an infrared sensor, or the like.

In some other embodiments, the power receiving device may alternatively be another low-power device, for example, an indicator or a buzzer.

According to a twelfth aspect, this application further provides a chip, applied to a wireless power supply apparatus. The chip includes one or more processors and an interface. The interface is configured to receive code instructions and transmit the code instructions to the processor. The processor is configured to run the code instructions, to enable the apparatus to perform the method in the foregoing implementation.

According to a thirteenth aspect, this application further provides a chip, applied to a wireless power receiving terminal. The chip includes one or more processors and an interface. The interface is configured to receive code instructions and transmit the code instructions to the processor. The processor is configured to run the code instructions, to enable the terminal to perform the method in the foregoing method embodiment.

DESCRIPTION OF EMBODIMENTS

Figure 1:
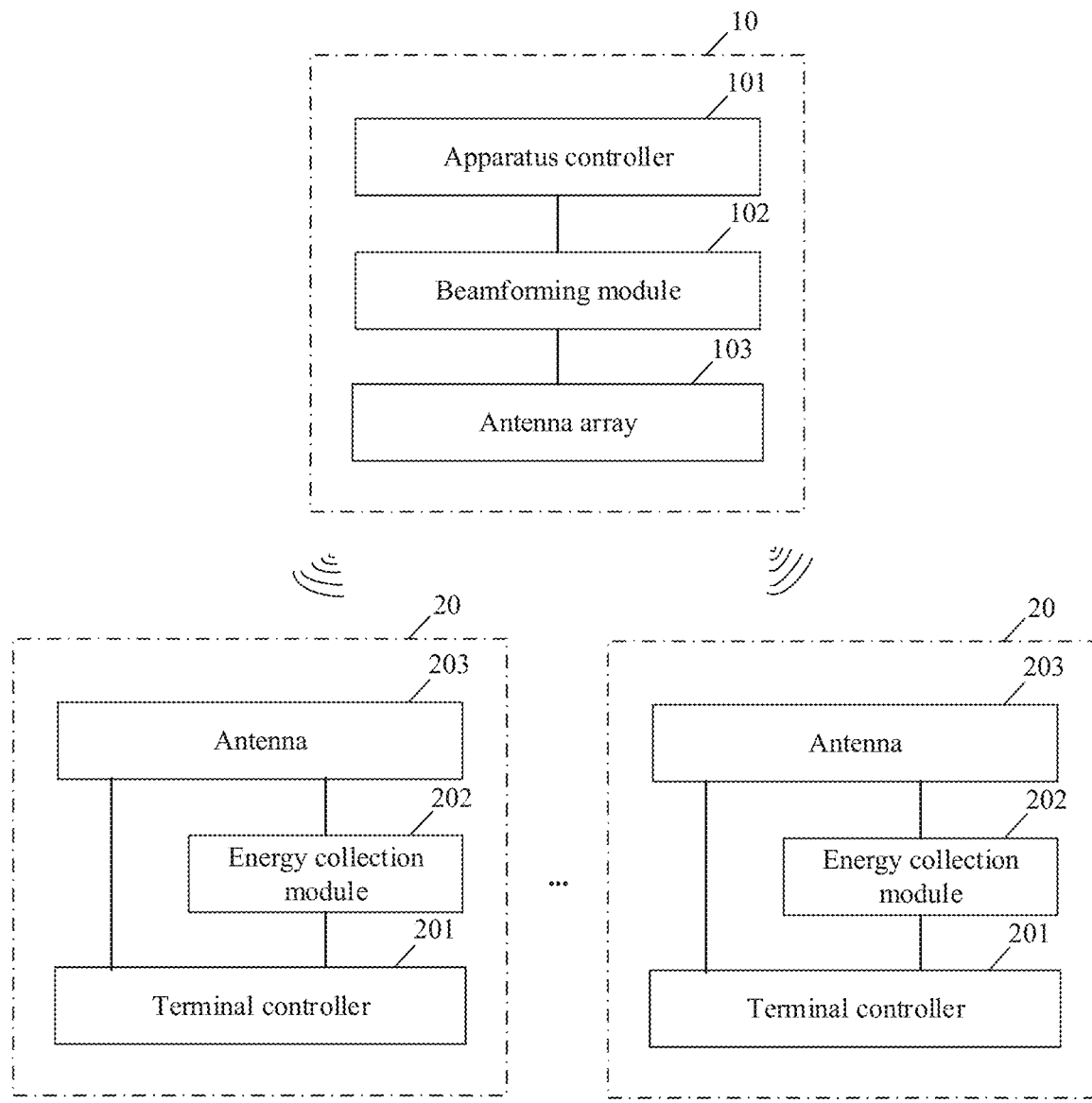
FIG. 1 is a schematic diagram of a system in which a wireless power receiving terminal is located according to an embodiment of this application.

To make persons skilled in the art better understand the technical solutions provided in the embodiments of this application, the following first describes application scenarios of the technical solutions provided in this application.

A wireless power supply apparatus in this application is configured to perform wireless power supply for a wireless power receiving terminal, which may be applied to a scenario in which a battery is not suitable for supplying power to a terminal, to avoid periodic replacement of a terminal battery, and is characterized by wireless and easy deployment. The apparatus may also be applied to a scenario in which a battery is used to supply power to a terminal. In this case, power is supplied to the battery of the terminal through wireless power supply, so that the battery of the terminal may be freed from manual periodic charging.

The wireless power receiving terminal in this application may be a sensor device in smart household, industrial sensor measurement, and other scenarios, for example, a temperature sensor, a humidity sensor, a water leakage sensor, a door status sensor, or an infrared sensor.

In some embodiments, the sensor is a low-power sensor. The low-power may mean that the sensor continuously works but power consumption of the sensor is relatively low, or the sensor periodically works and sleeps during non-working hours, leading to relatively low average power consumption. This is not limited in the embodiments of this application.

The wireless power supply apparatus transmits electromagnetic wave energy by using an antenna. The antenna may use an antenna array. A receive antenna of the terminal receives the electromagnetic wave energy. The wireless power supply apparatus focuses energy by using a beamforming technology, so that electromagnetic waves propagate in a particular direction. During beamforming, relative phases and amplitudes of transmitted waves are controlled, so that energy transmitted by the electromagnetic waves is concentrated in a target direction, while energy in all other directions is little.

In an existing wireless power supply system, manual measurement is required to determine a direction of the terminal relative to the wireless power supply apparatus, and then the wireless power supply apparatus is informed through manual input or wireless communication, so that the wireless power supply apparatus transmits electromagnetic waves based on the measured direction. More accurate direction measurement indicates higher efficiency of wireless power supply. Because an accurate manual measurement operation is required, a relatively long time is consumed. In addition, when the direction of the terminal relative to the apparatus changes, the direction of the terminal relative to the apparatus needs to be re-measured, which is repeatedly time-consuming. Therefore, deployment is inconvenient.

To resolve the foregoing technical problem, this application provides a wireless power supply apparatus, a wireless power receiving terminal, a transmission method, and a power supply method and system, to automatically determine a direction of the terminal relative to the apparatus, so as to avoid a manual direction measurement operation, and facilitate deployment.

The terms "first" and "second" in this application are merely intended for a purpose of description, and shall not be understood as an indication or implication of relative importance or an implicit indication of a quantity of indicated technical features.

In this application, unless otherwise expressly specified and limited, the term "connect" should be understood in a broad sense. For example, a "connection" may be a fixed connection, may be a detachable connection, or may be an integrated connection; and may be a direct connection, or an indirect connection through an intermediate medium.

Embodiment 1

This embodiment of this application provides a wireless power receiving terminal and a wireless power supply apparatus, which are described below with reference to an accompanying drawing.

FIG. 1 is a schematic diagram of a system in which a wireless power receiving terminal is located according to an embodiment of this application.

A wireless power supply apparatus 10 and a wireless power receiving terminal 20 together form a wireless power supply system. One wireless power supply apparatus may supply power to a plurality of wireless power receiving terminals. This embodiment of this application does not limit a quantity of terminals to which one apparatus simultaneously supplies power.

The wireless power supply apparatus 10 includes an apparatus controller 101, a beamforming module 102, and an antenna array 103.

The wireless power receiving terminal 20 includes a terminal controller 201, an energy collection module 202, and an antenna 203.

When direction finding information sent by the wireless power receiving terminal 20 is obtained, the apparatus controller 101 determines an electromagnetic wave transmission direction by using the direction finding information, and transmits information about the transmission direction to the beamforming module 102.

The transmission direction is a direction of the wireless power receiving terminal 20 relative to the wireless power supply apparatus 10.

The beamforming module 102 is configured to generate a plurality of radio frequency signals, and aggregate energy of electromagnetic waves corresponding to the plurality of radio frequency signals to the transmission direction.

The antenna array 103 is configured to transmit beamformed electromagnetic waves in the transmission direction, to perform wireless power supply for the wireless power receiving terminal 20.

The terminal controller 201 is configured to control the antenna 203 of the terminal to send the direction finding information to the wireless power supply apparatus.

The antenna 203 is configured to send the direction finding information, and transmit, to the energy collection module 202, the energy of the electromagnetic waves transmitted by the apparatus 10.

The energy collection module 202 is configured to collect and store the energy of the electromagnetic waves.

In some embodiments, the energy collection module 202 includes an energy storage unit, and the energy storage unit stores the energy of the electromagnetic waves, and then supplies power to the terminal 20.

In conclusion, the wireless power supply apparatus provided in this embodiment of this application has a direction finding function. When the direction finding information sent by the wireless power receiving terminal is obtained, the controller of the apparatus determines the electromagnetic wave transmission direction. The transmission direction represents the direction of the terminal relative to the apparatus. Then, the beamforming module aggregates the energy of the electromagnetic waves corresponding to the plurality of radio frequency signals to the transmission direction, and the antenna array transmits the beamformed electromagnetic waves, to supply power to the terminal. The apparatus can actively determine the direction of the terminal, thereby avoiding a manual measurement operation, and even if the direction of the terminal relative to the apparatus changes, the apparatus may re-determine the direction, to improve efficiency of wireless power supply for the terminal, thereby facilitating deployment. In addition, the controller of the apparatus may further determine directions of a plurality of terminals, so that the beamforming module concentrates the energy of the electromagnetic waves corresponding to the plurality of radio frequency signals to a plurality of transmission directions, that is, the apparatus further supports simultaneous power supply for the plurality of terminals.

Embodiment 2

The following describes working principles of the wireless power receiving terminal and apparatus with reference to specific implementations. For ease of description, in the following embodiment, an example in which one wireless power supply apparatus supplies power to one wireless power receiving terminal is used for description. A principle when the wireless power supply apparatus simultaneously supplies power to a plurality of wireless power receiving terminals is similar thereto, and is not described in detail in this embodiment of this application.

Figure 2:
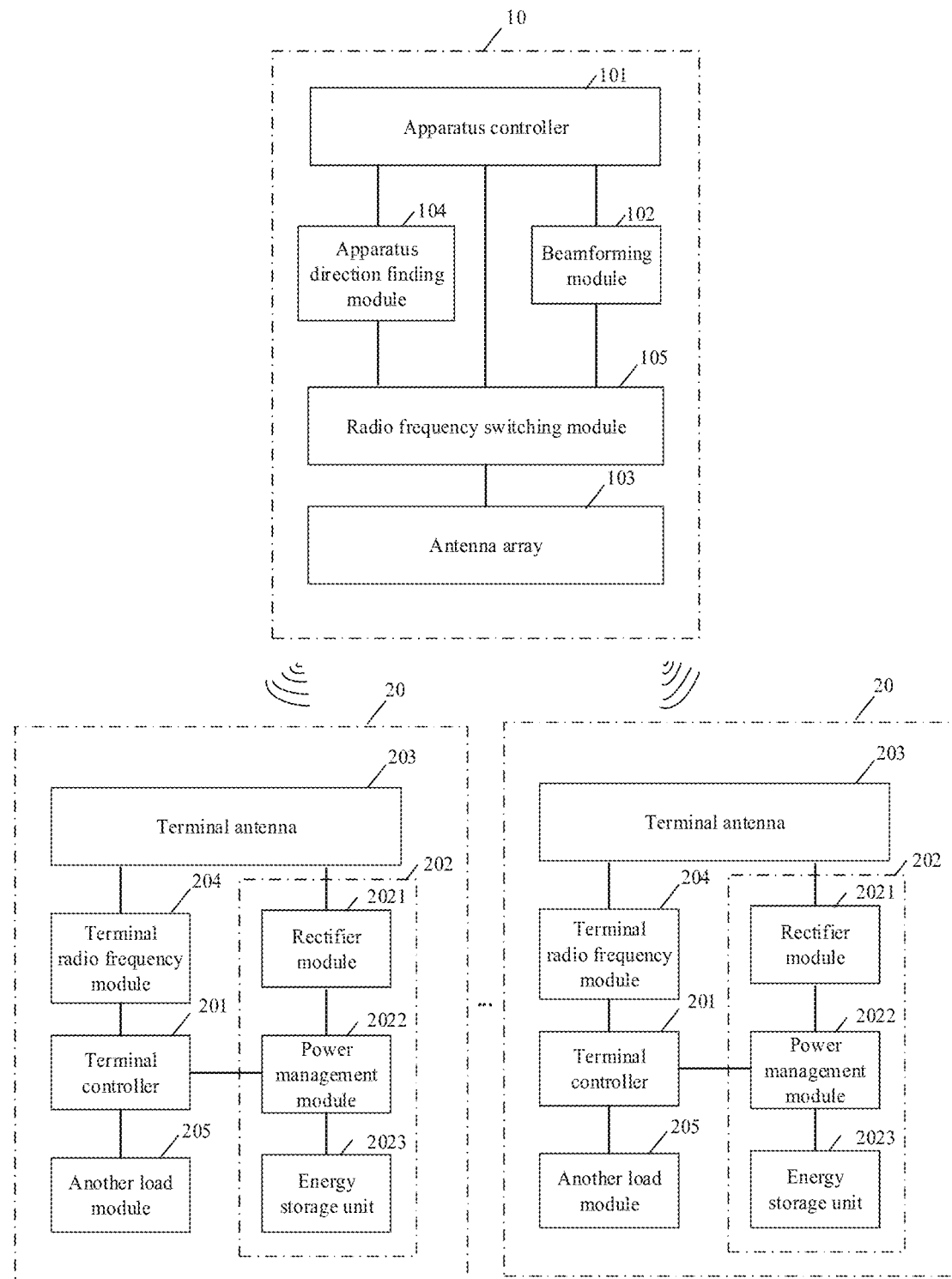
FIG. 2 is a schematic diagram of another system in which a wireless power receiving terminal is located according to an embodiment of this application.

FIG. 2 is a schematic diagram of another system in which a wireless power receiving terminal is located according to an embodiment of this application.

A difference between the apparatus shown in the figure and that in FIG. 1 lies in that the apparatus further includes an apparatus direction finding module 104 and a radio frequency switching module 105.

A difference between the terminal shown in the figure and that in FIG. 1 lies in that the terminal further includes a terminal radio frequency module 204.

The terminal radio frequency module 204 is configured to send a direction finding signal to the apparatus by using the antenna 203.

An example in which communication between the wireless power supply apparatus 10 and terminal 20 is performed by using a BLUETOOTH technology is used for description below.

Figure 3A:
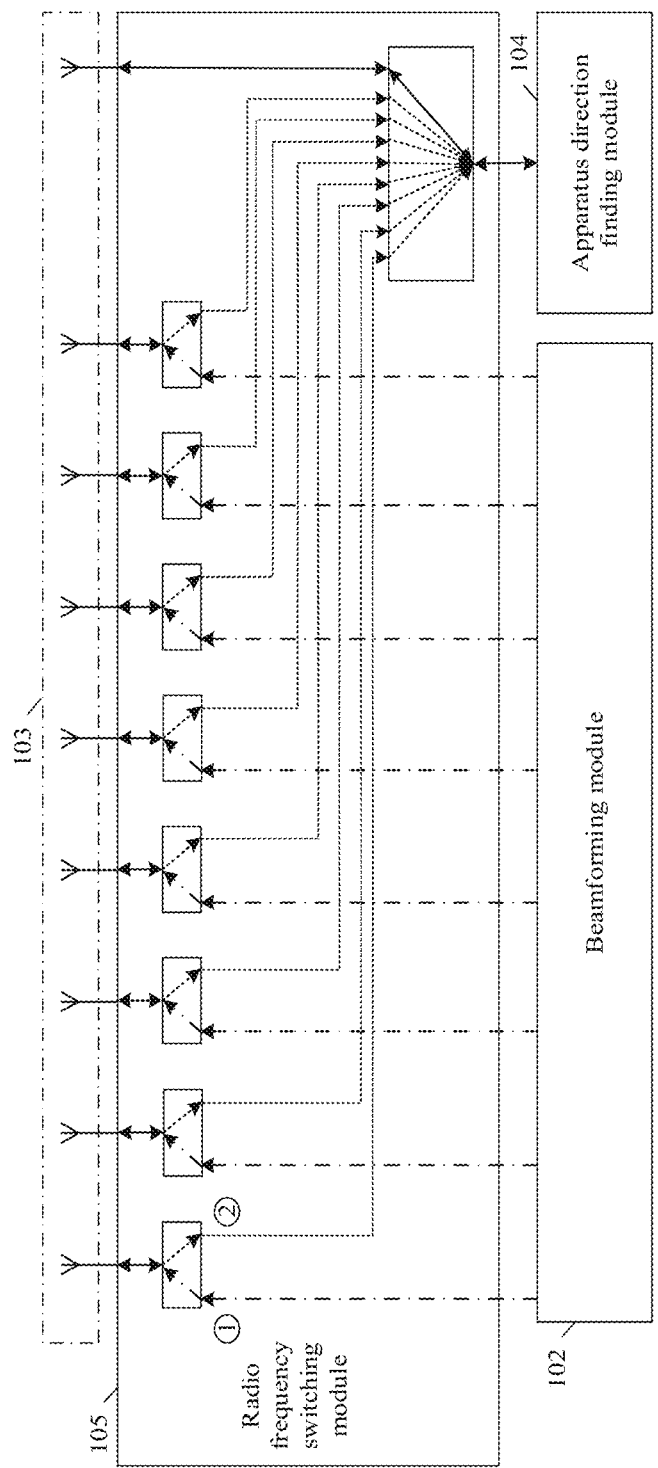
FIG. 3A is a schematic diagram of a radio frequency switching module according to an embodiment of this application.

FIG. 3A is a schematic diagram of a radio frequency switching module according to an embodiment of this application.

The radio frequency switching module 105 is configured for switching between direction finding and beamforming, and is described below.

The radio frequency switching module 105 has one end connected to the antenna array 103, and the other end connected to the apparatus direction finding module 104 and the beamforming module 102.

The apparatus controller 101 is configured to control the radio frequency switching module 105 to be in a signal transmission state, that is, corresponding to a line ② shown in the figure, so that the device direction finding module 104 receives the direction finding signal. The direction finding signal is received and transmitted to the device direction finding module 104 by the antenna array 103. The direction finding signal includes the direction finding information.

After determining the electromagnetic wave transmission direction, the apparatus controller 101 controls the radio frequency switching module 105 to switch to a power transmission state, that is, corresponding to a line ① shown in the figure, so that the beamforming module 102 transmits the beamformed electromagnetic waves by using the antenna array 103.

A working state of the radio frequency switching module 105 may be switched by using a control switch, and the apparatus controller 101 may control a status of the control switch. The control switch may use a single pole double throw (SPDT) switch, and a control signal of the control switch may be detected by using an oscilloscope.

Figure 3B:
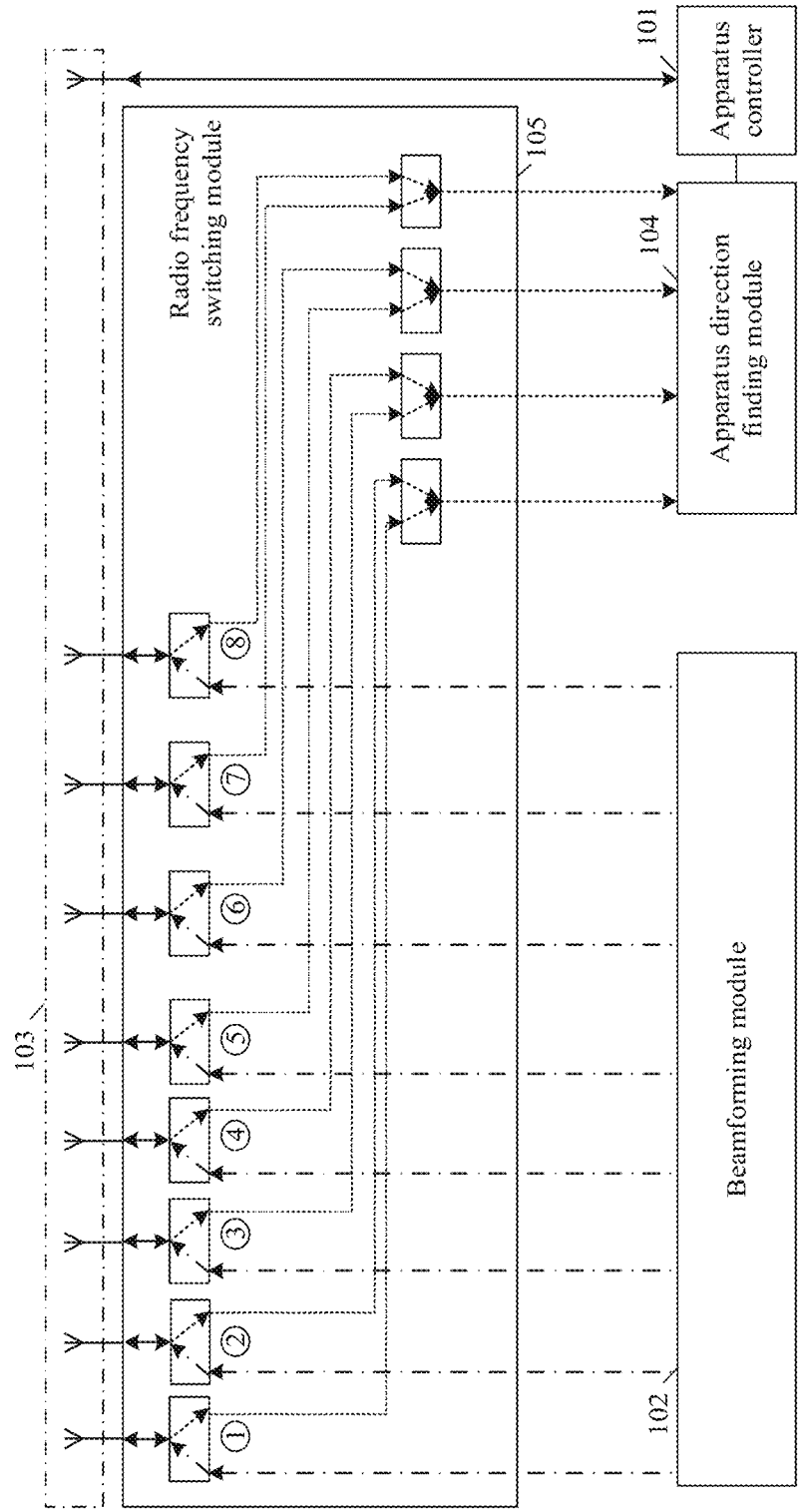
FIG. 3B is a schematic diagram of another radio frequency switching module according to an embodiment of this application.

Alternatively, FIG. 3B is a schematic diagram of another radio frequency switching module according to an embodiment of this application.

A short-range wireless communications technology used between the apparatus 10 and the terminal 20 shown in the figure supports a multiple-input multiple-output (MIMO) technology, for example, may be WIFI technology.

In this case, the radio frequency switching module 105 transmits communication data obtained by the antenna array to the apparatus controller 101. In the figure, for example, a quantity of channels is 4. Direction finding signals received by eight antennas are divided into two groups, that is, ①, ③, ⑤, and ⑦ are put into one group, and ②, ④, ⑥, and ⑧ are put into the other group. The radio frequency switching module 105 switches a channel switch, so that the apparatus direction finding module 104 alternately obtains the two groups of direction finding signals. In this case, the channel switch may be implement in the same manner as the control switch.

The quantity of channels may alternatively be another quantity. This is not limited in this embodiment of this application. The apparatus direction finding module 104 is configured to obtain direction finding information in the direction finding signals, and transmit the obtained direction finding information to the apparatus controller 101.

In a possible implementation, the direction finding information may indicate to the apparatus 10 that the terminal 20 needs wireless power supply.

After obtaining the direction finding information, the apparatus controller 101 determines an electromagnetic wave transmission direction, and transmits information about the transmission direction to the beamforming module 102.

In a possible implementation, the terminal controller 201 may control the terminal to send the direction finding signal to the apparatus based on a preset period. In this case, a function of the direction finding signal is to enable the apparatus to periodically obtain a status of the terminal, for example, determine whether the terminal 20 can normally perform communication connection to the apparatus 10. In addition, the apparatus controller 101 may be further enabled to periodically perform direction finding and positioning, to adjust or calibrate a direction of the terminal 20 relative to the apparatus 10, so as to improve efficiency of wireless power supply for the terminal 20.

In some embodiments, after receiving the direction finding information for a predetermined time or after determining the transmission direction, the apparatus controller 101 controls the apparatus 10 to send a response signal to the terminal 20. The response signal is used as a feedback signal of the apparatus, and may instruct the terminal 20 to stop further sending the direction finding signal.

The apparatus controller 101 determines the transmission direction by using phase information and wavelength information that are determined by the direction finding information and a relative position relationship between antennas included in the apparatus antenna array 103, which is described below with reference to accompanying drawings.

For ease of understanding, the following first describes a principle of determining a transmission direction on a plane.

Figure 4A:
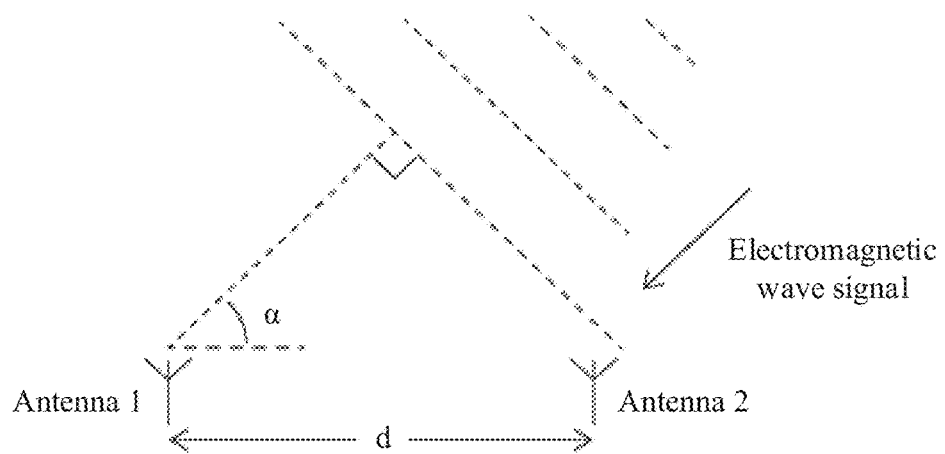
FIG. 4A is a schematic principle diagram 1 of signal-based direction finding according to an embodiment of this application.

FIG. 4A is a schematic principle diagram 1 of signal-based direction finding according to an embodiment of this application.

The apparatus controller 101 in this embodiment of this application uses an angle-of-arrival (AoA) direction finding technology. The apparatus antenna array 103 includes a plurality of antennas that may be configured to receive a direction finding signal, that is, an electromagnetic wave signal in the figure.

In the figure, an antenna 1 and an antenna 2 are located on the same horizontal plane as the antenna (the terminal antenna) that transmits the direction finding signal. In this case, an azimuth angle $\alpha$ is a transmission direction, and also represents a direction of the terminal 20 relative to the apparatus 10. In this case, the azimuth angle $\alpha$ may be determined by using a phase difference $\psi$ between electromagnetic waves received by the two antennas, a wavelength $\lambda$ of the electromagnetic waves received by the antennas, and a distance d between the antenna 1 and the antenna 2. For details, refer to the following formula.

$$\alpha = \arccos((\psi\lambda)/(2\pi d)) \qquad (1)$$

The distance d between the antenna 1 and the antenna 2 is an inherent parameter of the antenna array, and may be determined in advance. The antenna 1 and the antenna 2 may be any two antennas in the apparatus antenna array 103.

The foregoing description is merely a principle description. In an actual application, antennas of the terminal 20 and the apparatus 10 may not be located on a same plane.

Figure 4B:
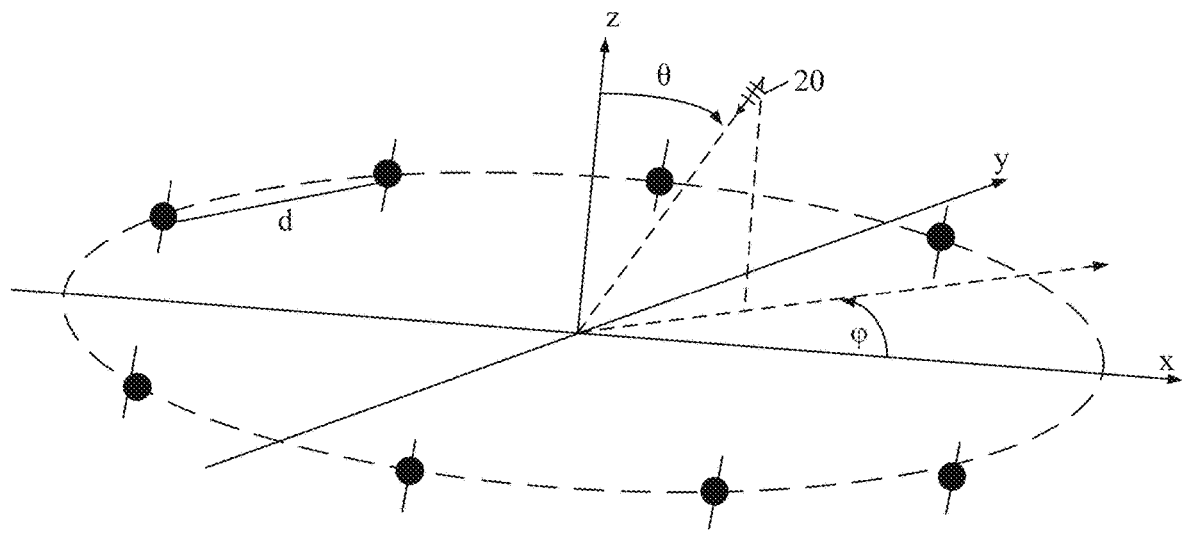
FIG. 4B is a schematic principle diagram 2 of signal-based direction finding according to an embodiment of this application.

FIG. 4B is a schematic principle diagram 2 of signal-based direction finding according to an embodiment of this application.

When the direction of the terminal 20 is determined within a power supply range of the apparatus, an azimuth angle φ and an elevation angle θ of the terminal 20 relative to the apparatus need to be determined.

In this case, a transmission direction in a three-dimensional space may be determined by using a relative position relationship between antennas. The relative position relationship includes a relative direction and distance between the antennas. A specific principle is similar to the foregoing, and details are not described herein again in this embodiment of this application.

After determining the electromagnetic wave transmission direction, the apparatus controller 101 transmits the information about the transmission direction to the beamforming module 102, so that the beamforming module generates a plurality of radio frequency signals, and aggregates energy of electromagnetic waves corresponding to the plurality of radio frequency signals to the transmission direction. The beamforming module 102 may include a power divider, a phase shifter, and the like. An implementation of the beamforming module 102 is a relatively mature technology, and details are not described herein in this embodiment of this application.

The energy collection module 202 of the terminal 20 in this embodiment of this application includes a rectifier module 2021, a power management module 2022, and an energy storage unit 2023.

After receiving the electromagnetic waves, the antenna 203 converts an alternating magnetic field signal into an alternating current, and then transmits the alternating current to the rectifier module 2021. The rectifier module 2021 converts the alternating current into a direct current and then outputs the direct current.

The power management module 2022 collects and manages electric energy.

On one hand, the energy storage unit 2023 is configured to store the electric energy collected by the power management module 2022, and on the other hand, may also store electric energy provided in another auxiliary power supply manner.

The terminal controller 201 can further control another load module 205.

In some embodiments, the other load module 205 is a low-power sensor module. In this case, the terminal controller 201 may control the low-power sensor module to perform corresponding measurement work. The terminal may further send data collected by the sensor module or processed data to the wireless power supply apparatus by using the antenna 203.

Communication between the wireless power supply apparatus 10 and terminal 20 provided in this embodiment of this application may be implemented by using a short-range wireless communications technology.

The short-range wireless communications technology includes, but is not limited to, BLUETOOTH, WIFI, a ZIGBEE protocol, UWB, a RFID technology, a home Internet of things communications protocol technology, Sub-1G, and the like. This is not limited in this embodiment of this application.

For the wireless power supply apparatus 10, direction finding and electromagnetic wave transmission are implemented based on the antenna array 103. Therefore, this embodiment of this application further provides an antenna array applied to the wireless power supply apparatus. The following describes the antenna array with reference to an accompanying drawing.

Figure 5:
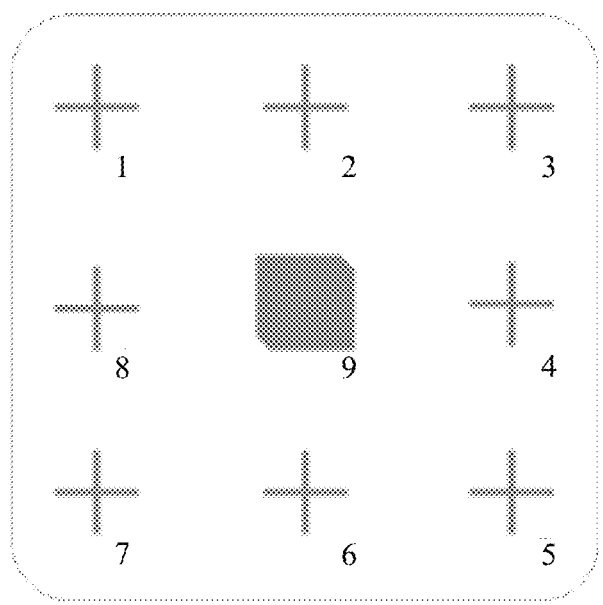
FIG. 5 is a schematic diagram of an antenna array according to an embodiment of this application.

FIG. 5 is a schematic diagram of an antenna array according to an embodiment of this application.

The antenna array includes a first antenna element and a second antenna element.

The first antenna element is configured to perform data communication with the wireless power receiving terminal 20 and trigger, when receiving the direction finding signal, the second antenna element to start to receive the direction finding signal.

The first antenna element in the figure is an antenna 9.

In some embodiments, when the other load module 205 of the terminal 20 includes a sensor, the terminal 20 transmits, to the wireless power supply apparatus 10 through data communication, data collected by the sensor or data obtained after the collected data is processed.

The second antenna element is an antenna array, and is configured to receive the direction finding signal and transmit the beamformed electromagnetic waves.

The second antenna element in the figure is an antenna 1 to an antenna 8.

In some other embodiments, the first antenna element may include a plurality of antennas, and the second antenna element may include another quantity of antennas. This is not limited in this embodiment of this application.

An example in which communication between the apparatus and the terminal is performed by using the BLUETOOTH technology is used below to describe a working principle of the apparatus antenna array.

Bluetooth Core Specification (Version 5.1) defines a constant tone extension (CTE) request process. The CTE is a data string that includes a series of switching timeslots and sampling timeslots and that is attached to a normal data packet. The CTE includes a string of digits "1", so that a receive end (the wireless power supply apparatus in this application) of the signal can extract I/Q data from the signal. The I/Q data is in-phase and quadrature phase information used to determine a location of a transmitter, that is, the wireless power receiving terminal, of the data packet, and does not generate an interference effect on modulation.

Therefore, after the wireless power supply apparatus 10 receives the data packet that includes the CTE and that is sent by the terminal 20 (that is, receives the direction finding signal), the apparatus 10 switches between different antennas based on a specific order, that is, switches between the antennas 1 to 8 to receive signals, performs I/Q sampling during the CTE, and determines phase information by using I/Q samples.

The antenna array shown in FIG. 5 uses a single-band antenna, that is, a frequency band is shared by data communication, direction finding, and electromagnetic wave transmission (power transmission).

In another possible implementation, the antenna array uses a multi-band antenna, that is, different frequency bands are respectively used for data communication, direction finding, and electromagnetic wave transmission. Because data communication and signal-based direction finding functions are not affected when the multi-band antenna transmits power, the first antenna element separately disposed may not be included when the multi-band antenna is used, and functions of the first antenna element may be implemented by the second antenna element.

The following describes an implementation of the antenna 203.

In a possible implementation, the antenna 203 of the terminal includes a third antenna element and a fourth antenna element.

The third antenna element is configured to perform data communication with the apparatus and send the direction finding signal.

For example, when the terminal 20 is a sensor device, the third antenna element may transmit, to the apparatus, measurement data obtained by the terminal or data obtained after the measurement data is processed. The third antenna element may further transmit other data. This is not limited in this embodiment of this application.

The fourth antenna element is configured to transmit, to the energy collection module 202, the energy of the received electromagnetic waves transmitted by the apparatus.

The third antenna element and the fourth antenna element may each be one antenna.

In another possible implementation, the terminal antenna 203 may be a separate antenna, and the terminal controller 201 switches a working state of the terminal antenna 203 in a time division multiplexing manner.

The terminal controller 201 first controls the terminal antenna 203 to be in a data transmission state, so that the terminal antenna 203 sends the direction finding signal; and then controls the terminal antenna to be in a power receiving state, so that the terminal antenna 203 transmits, to the energy collection module, the energy of the electromagnetic waves transmitted by the apparatus.

The response signal sent by the apparatus 10 may be used to indicate the terminal controller 201 to switch the working state of the terminal antenna 203.

When the apparatus antenna array 103 uses a multi-band antenna, the terminal antenna 203 may be correspondingly a multi-band antenna. The terminal antenna 203 uses different frequency bands to perform data communication and electromagnetic wave energy receiving. In this case, the terminal antenna 203 may be one antenna.

When the apparatus antenna array 103 uses a multi-band antenna, the terminal antenna 203 may alternatively use a plurality of single-band antennas. In this case, a quantity of the single-band antennas of the terminal is the same as a quantity of frequency bands of the apparatus antenna array 103, and an operating frequency band of each single-band antenna of the terminal corresponds to one frequency band used by the apparatus antenna array 103.

Mounting manners of the wireless power supply apparatus 10 and terminal 20 are not limited in this embodiment of this application. In some embodiments, the apparatus 10 may be mounted in a wall-mounted or ceiling-mounted manner, and the terminal 20 is mounted within the power supply range of the apparatus.

Figure 6:
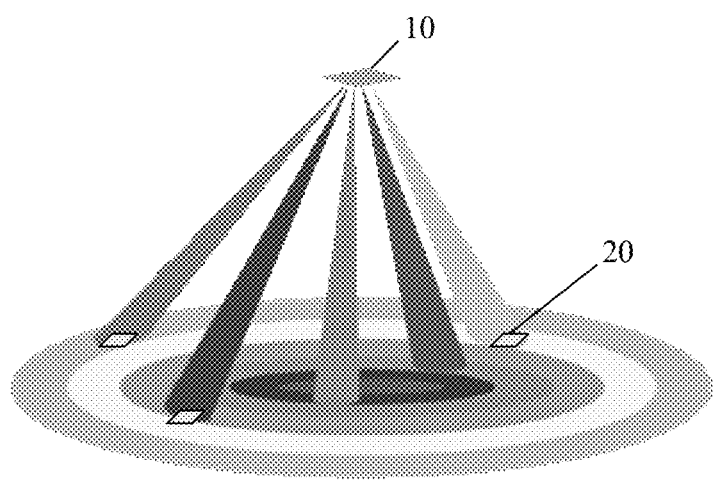
FIG. 6 is a schematic diagram of a ceiling-mounted wireless power supply apparatus according to an embodiment of this application.

FIG. 6 is a schematic diagram of a ceiling-mounted wireless power supply apparatus according to an embodiment of this application.

After mounted on a ceiling, the wireless power supply apparatus 10 supplies power to the terminal 20 within the wireless power supply range of the apparatus.

For the wireless power receiving terminal 20, electric energy required for power-on may be completely provided by the apparatus 10, or may be provided by an external auxiliary power supply, for example, using a small-capacity battery, an external Universal Serial Bus (USB) power supply, or near field communication (NFC) to obtain power.

In some embodiments, there is no battery inside the wireless power receiving terminal or there is a battery inside the terminal 20 but the battery does not store power, and electric energy required for power-on of the terminal 20 is provided by the wireless power supply apparatus 10. However, in this case, the direction finding signal cannot be sent. Therefore, it is necessary to wait for the wireless power supply apparatus 10 to provide electric energy through blind sweep of electromagnetic waves. That is, the apparatus controller 101 is further configured to control, before the direction of the terminal 20 is known, the device 10 to transmit electromagnetic waves at different azimuth angles and elevation angles. The apparatus 10 changes an azimuth angle and an elevation angle for transmitting electromagnetic waves, to sweep within the power supply coverage of the apparatus, so as to provide electric energy required for power-on of the terminal 20.

In a possible implementation, the wireless power supply apparatus 10 may be controlled to perform blind sweep every preset period, to provide electric energy required for power-on to a newly added terminal 20.

In another possible implementation, the wireless power supply apparatus 10 may be further connected to a control device, for example, a mobile terminal or a computer. When a user adds a new terminal 20 to the power supply coverage of the wireless power supply apparatus 10, the user may instruct, by using the control device, the wireless power supply apparatus 10 to perform blind sweep, to provide electric energy required for power-on to the newly added terminal 20.

In still another possible implementation, the wireless power supply apparatus 10 may alternatively perform blind sweep during each power-on. When a user adds a new terminal 20 to the power supply coverage of the wireless power supply apparatus 10, the wireless power supply apparatus 10 may be re-powered on to trigger blind sweep, so as to provide electric energy required for power-on to the newly added terminal 20.

In an example, blind sweep of the apparatus 10 may alternatively be triggered in other manners, which are not described in this embodiment of this application one by one herein.

In conclusion, the wireless power supply apparatus provided in this application has a direction finding function. When the direction finding information in the direction finding signal sent by the wireless power receiving terminal is obtained, the controller of the apparatus determines the electromagnetic wave transmission direction. The transmission direction represents the direction of the terminal relative to the apparatus. Then, the beamforming module aggregates the energy of the electromagnetic waves corresponding to the plurality of radio frequency signals to the transmission direction, and the antenna array of the apparatus transmits the beamformed electromagnetic waves, to supply power to the terminal. The apparatus can actively determine the direction of the terminal, thereby avoiding a manual measurement operation, and even if the direction of the terminal relative to the apparatus changes, the apparatus may re-determine the direction, to improve efficiency of wireless power supply for the terminal, thereby facilitating deployment. In addition, the controller of the apparatus may further determine directions of a plurality of terminals, so that the beamforming module concentrates the energy of the electromagnetic waves corresponding to the plurality of radio frequency signals to a plurality of transmission directions, that is, the apparatus further supports simultaneous power supply for the plurality of terminals.

Embodiment 3

This embodiment of this application further provides a wireless power receiving terminal and apparatus. A difference from Embodiment 1 lies in that the terminal has a direction finding function. The following describes the terminal and the apparatus with reference to an accompanying drawing.

Figure 7:
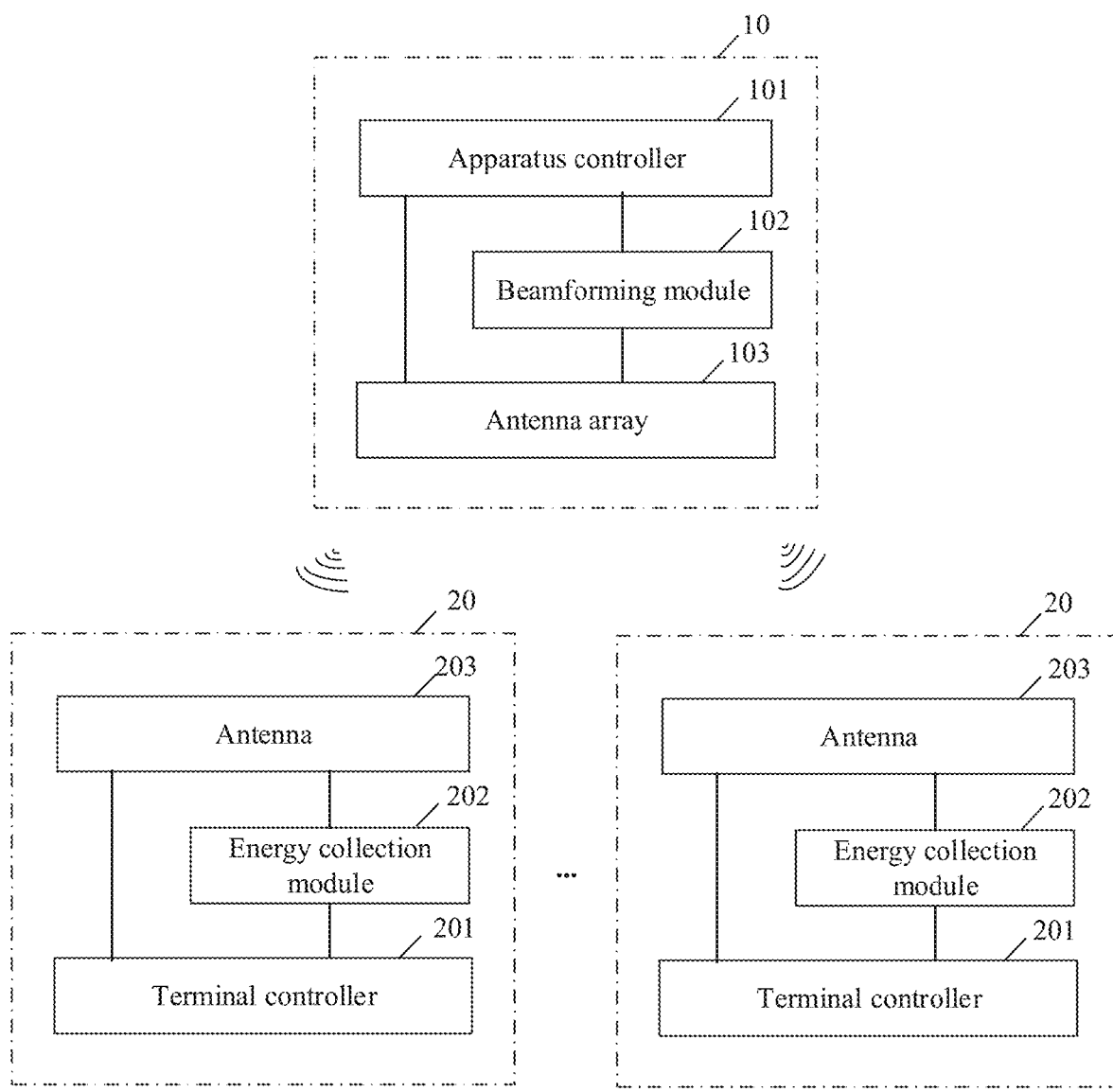
FIG. 7 is a schematic diagram of still another system in which a wireless power receiving terminal is located according to an embodiment of this application.

FIG. 7 is a schematic diagram of still another system in which a wireless power receiving terminal is located according to an embodiment of this application.

A wireless power supply apparatus 10 includes an apparatus controller 101, a beamforming module 102, and an antenna array 103.

The apparatus controller 101 controls the wireless power supply apparatus 10 to send direction finding information to a wireless power receiving terminal 20, obtains direction information sent by the terminal 20, determines an electromagnetic wave transmission direction by using the direction information, and transmits information about the transmission direction to the beamforming module 102.

The direction information represents a relative position relationship between the terminal 20 and the apparatus 10.

In an embodiment, the direction information is a direction of the terminal 20 relative to the apparatus 10, that is, the electromagnetic wave transmission direction.

In another embodiment, the direction information is a direction of the apparatus 10 relative to the terminal 20.

There may be other implementations of the direction information, which are not listed in this embodiment of this application one by one herein.

The beamforming module 102 is configured to generate a plurality of radio frequency signals, and aggregate energy of electromagnetic waves corresponding to the plurality of radio frequency signals to the transmission direction.

The antenna array 103 is configured to send the direction finding information, receive the direction information, and transmit beamformed electromagnetic waves.

The wireless power receiving terminal 20 includes an antenna 203, an energy collection module 202, and a terminal controller 201.

The terminal controller 201 determines the direction information by using the direction finding information sent by the wireless power supply apparatus, and sends the direction information to the apparatus 10. The direction information represents the relative position relationship between the terminal 20 and the apparatus.

The terminal antenna 203 is configured to receive the direction finding information, send the direction information, and transmit, to the energy collection module 202, energy of the electromagnetic waves transmitted by the apparatus 10.

The energy collection module 202 is configured to collect and store the energy of the electromagnetic waves. In some embodiments, the energy collection module 202 includes an energy storage unit, and the energy storage unit stores the energy of the electromagnetic waves, and then supplies power to the terminal 20.

In conclusion, the wireless power receiving terminal provided in this embodiment of this application has a direction finding function. The terminal may determine the direction information representing the relative position relationship between the terminal and the apparatus, and send the direction information to the apparatus. The controller of the apparatus determines the electromagnetic wave transmission direction by using the direction information. Then, the beamforming module aggregates the energy of the electromagnetic waves corresponding to the plurality of radio frequency signals to the transmission direction, and the apparatus antenna array transmits the beamformed electromagnetic waves, to supply power to the terminal. The terminal can actively determine the direction of the terminal relative to the apparatus, thereby avoiding a manual measurement operation, and after the direction of the terminal relative to the apparatus changes, the terminal may re-determine the direction, to improve efficiency of wireless power supply of the apparatus, thereby facilitating deployment. In addition, when the controller of the apparatus determines that there are a plurality of transmission directions, the beamforming module may further concentrate the energy of the electromagnetic waves corresponding to the plurality of radio frequency signals to the plurality of transmission directions, that is, the apparatus further supports simultaneous power supply for a plurality of terminals.

Embodiment 4

The following describes working principles of another wireless power receiving terminal and apparatus with reference to specific implementations. In the following embodiment, an example in which one wireless power supply apparatus supplies power to one wireless power receiving terminal is still used for description. A principle when the wireless power supply apparatus simultaneously supplies power to a plurality of wireless power receiving terminals is similar thereto, and is not described in detail in this embodiment of this application.

Figure 8:
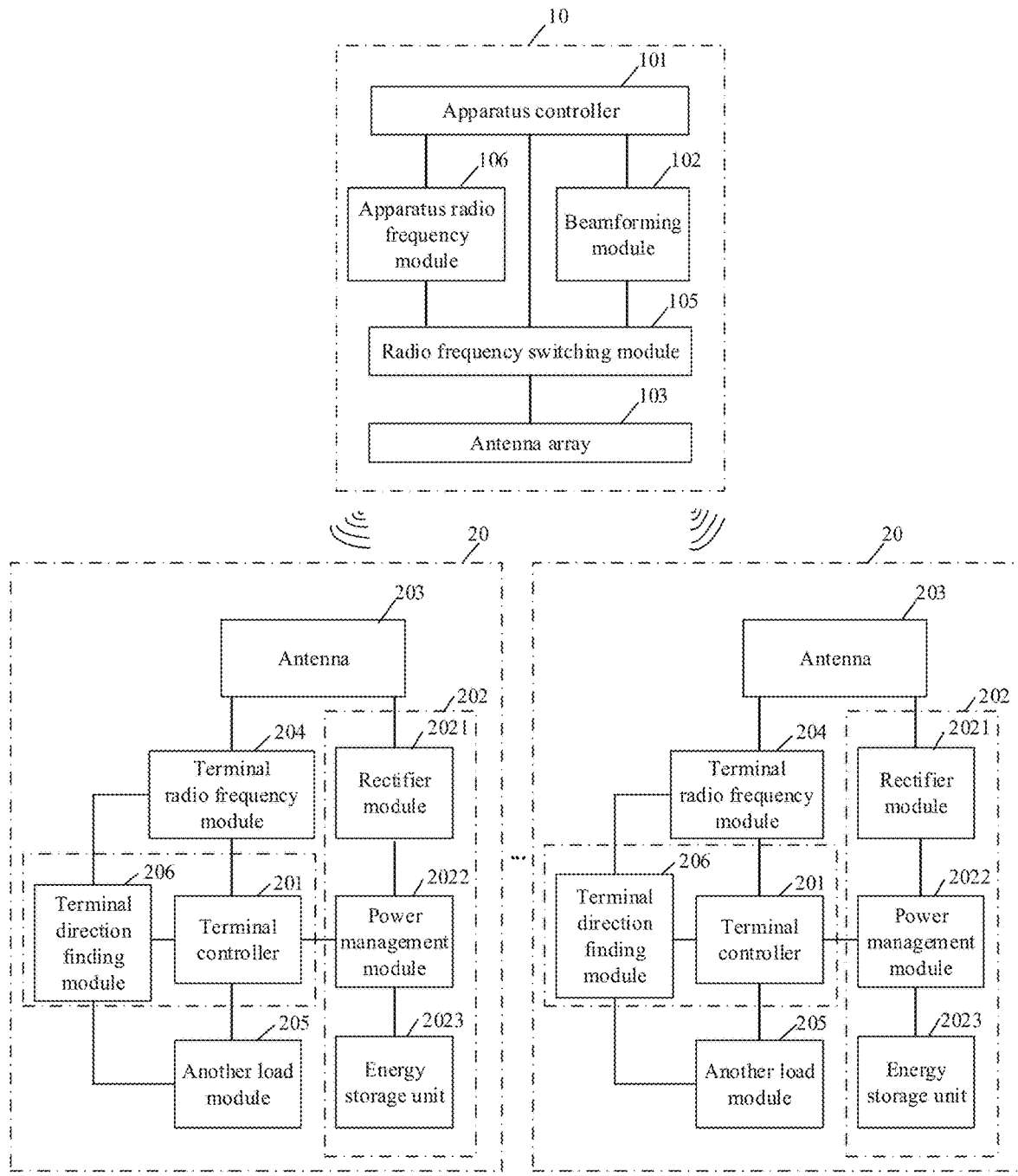
FIG. 8 is a schematic diagram of yet another system in which a wireless power receiving terminal is located according to an embodiment of this application.

FIG. 8 is a schematic diagram of yet another system in which a wireless power receiving terminal is located according to an embodiment of this application.

A difference between the apparatus shown in the figure and that in FIG. 7 lies in that the apparatus further includes a radio frequency switching module 105 and an apparatus radio frequency module 106.

A difference between the terminal shown in the figure and that in FIG. 7 lies in the terminal further includes a terminal radio frequency module 204 and a terminal direction finding module 206.

The apparatus radio frequency module 106 is configured to send a direction finding signal by using the antenna array 103, and transmit a power supply request signal obtained by the antenna array 103 to the apparatus controller 101.

The direction finding signal includes the direction finding information.

The radio frequency switching module 105 is configured for switching between signal transmission and beamforming, and is described below.

Figure 9A:
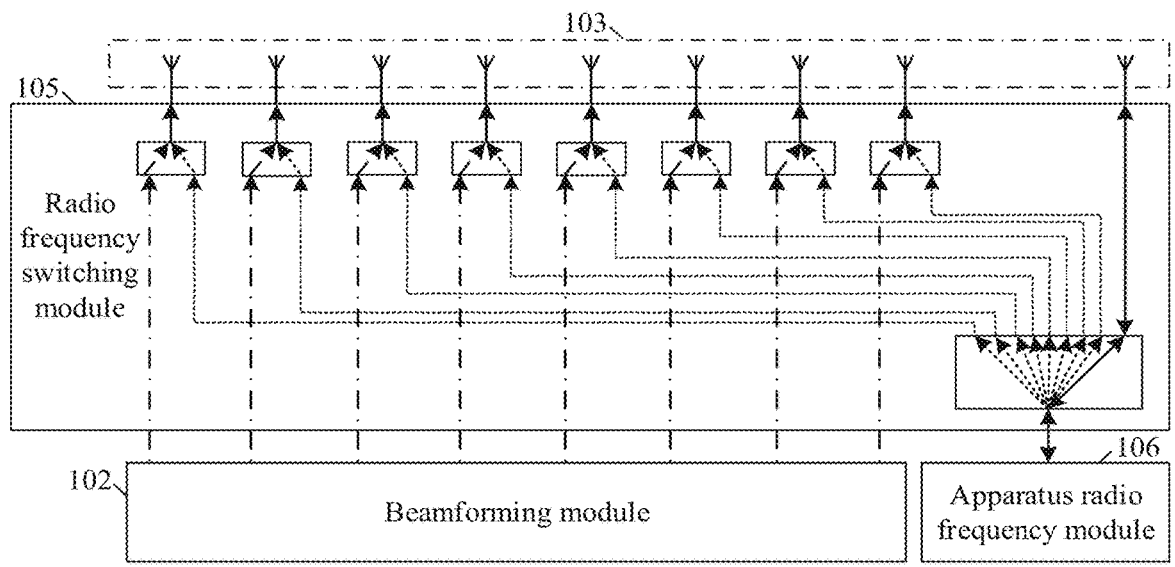
FIG. 9A is a schematic diagram of still another radio frequency switching module according to an embodiment of this application.

FIG. 9A is a schematic diagram of still another radio frequency switching module according to an embodiment of this application.

The radio frequency switching module 105 has one end connected to the apparatus antenna array 103, and the other end connected to the apparatus radio frequency module 106 and the beamforming module 102.

The apparatus controller 101 is configured to control the radio frequency switching module 105 to be in a signal transmission state, so that the antenna array 103 sends the direction finding signal and the apparatus radio frequency module 106 obtains the power supply request signal; and after the transmission direction is determined, control the radio frequency switching module 105 to switch to a power transmission state, so that the beamforming module transmits the beamformed electromagnetic waves by using the apparatus antenna array 103.

A working state of the radio frequency switching module 105 may be switched by using a control switch, and the apparatus controller 101 may control the control switch. The control switch may use an SPDT switch, and a control signal of the control switch may be detected by using an oscilloscope.

Figure 9B:
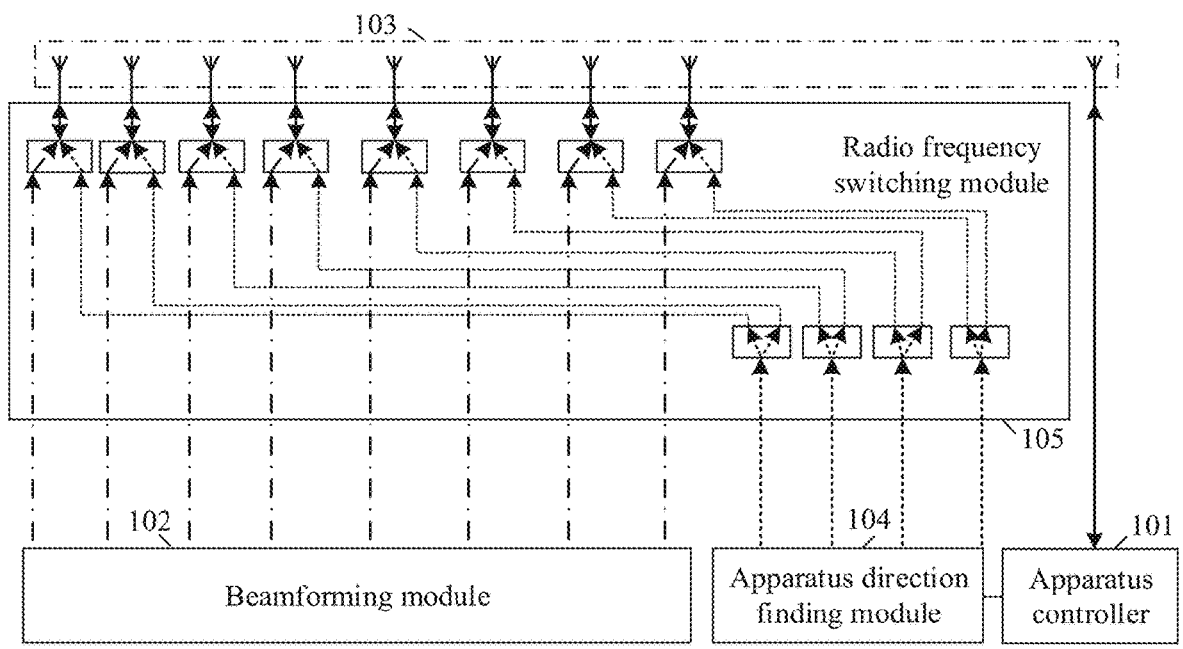
FIG. 9B is a schematic diagram of yet another radio frequency switching module according to an embodiment of this application.

Alternatively, FIG. 9B is a schematic diagram of yet another radio frequency switching module according to an embodiment of this application.

A short-range wireless communications technology used between the apparatus 10 and the terminal 20 shown in the figure supports multiple-input multiple-output, for example, may be a wireless fidelity technology.

In this case, the radio frequency switching module 105 transmits communication data obtained by the antenna to the apparatus controller 101. In the figure, for example, a quantity of channels is 4. Direction finding signals are divided into two groups, and each group corresponds to four antennas. The radio frequency switching module switches the channel switch so that each antenna group alternately transmits the direction finding signal. The channel switch in this case may be implemented in the same manner as the foregoing control switch.

The quantity of channels may alternatively be another quantity. This is not limited in this embodiment of this application.

The apparatus radio frequency module 106 sends the obtained power supply request signal to the apparatus controller 101.

The terminal radio frequency module 204 is configured to transmit the direction finding signal to the terminal direction finding module 206, and send the power supply request signal by using the antenna 203.

The terminal direction finding module 206 is configured to obtain the direction finding information in the direction finding signal, and transmit the direction finding information to the terminal controller 201.

The apparatus controller 101 may further send the direction finding signal based on a preset period, so that the terminal controller 201 periodically performs direction finding and positioning, to adjust or calibrate the direction of the terminal 20 relative to the apparatus 10, so as to improve efficiency of wireless power supply for the terminal 20.

In some embodiments, after the direction information is determined, the apparatus controller 101 controls the apparatus 10 to send a response signal to the terminal 20. The response signal is used as a feedback signal of the apparatus, and may instruct the terminal 20 to stop further sending the power supply request signal.

The terminal controller 201 is configured to determine the direction information based on phase information and wavelength information that are determined by the direction finding information and a relative position relationship between antennas included in the antenna array. The relative position relationship between the antennas includes a distance between the antennas and a relative direction between the antennas. The following provides specific description with reference to an accompanying drawing.

For ease of understanding, the following first describes a principle of determining a transmission direction on a plane.

Figure 10:
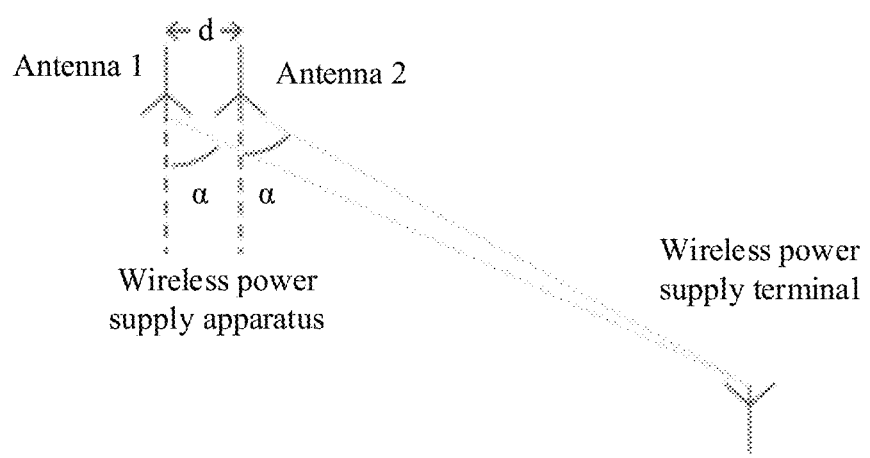
FIG. 10 is a schematic principle diagram 3 of signal-based direction finding according to an embodiment of this application.

FIG. 10 is a schematic principle diagram 3 of signal-based direction finding according to an embodiment of this application.

The terminal controller 201 in this embodiment of this application may use an angle-of-departure (AoD) direction finding technology. The apparatus antenna array 103 includes a plurality of antennas for sequentially transmitting the direction finding signal based on a specific order.

In the figure, an antenna 1 and an antenna 2 are located on the same horizontal plane as the antenna (the terminal antenna) that receives the direction finding signal. In this case, an azimuth angle α is a transmission direction, and also represents a direction of the terminal 20 relative to the apparatus 10. In this case, the azimuth angle α may be determined by using a phase difference ψ between direction finding signals sent by the antenna 1 and the antenna 2, a wavelength λ of the direction finding signals, and a distance d between the antenna 1 and the antenna 2. For details, refer to the following formula.

$$\alpha = \arcsin((\psi\lambda)/(2\pi d)) \qquad (2)$$

The distance d between the antenna 1 and the antenna 2 is an inherent parameter of the antenna array, and may be determined in advance. The antenna 1 and the antenna 2 may be any two antennas in the apparatus antenna array 103.

The foregoing description is merely a principle description. In an actual application, antennas of the terminal 20 and the apparatus 10 may not be located on a same plane.

Further, refer to the schematic principle diagram shown in FIG. 4B. When the direction of the terminal is determined within a power supply range of the apparatus, an azimuth angle φ and an elevation angle θ of the terminal relative to the apparatus need to be determined. In this case, a transmission direction in a three-dimensional space may be determined by using a relative position relationship between antennas. The relative position relationship includes a relative direction and distance between the antennas. A specific principle is similar to the foregoing, and details are not described herein again in this embodiment of this application.

After determining the direction information, the terminal controller 201 controls the terminal 20 to send the power supply request signal including the direction information to the apparatus. The apparatus controller 101 determines the electromagnetic wave transmission direction by using the direction information, and transmits information about the transmission direction to the beamforming module 102, so that the beamforming module 102 generates a plurality of radio frequency signals, and aggregates energy of electromagnetic waves corresponding to the plurality of radio frequency signals to the transmission direction. The beamforming module 102 may include a power divider, a phase shifter, and the like. An implementation of the beamforming module 102 is a relatively mature technology, and details are not described herein in this embodiment of this application.

For a specific description of the energy collection module 202 of the terminal 20, refer to the foregoing Embodiment 2. Details are not described herein again in this embodiment of this application.

Communication between the wireless power supply apparatus 10 and terminal 20 provided in this embodiment of this application may be implemented by using a short-range wireless communications technology.

The short-range wireless communications technology includes, but is not limited to, BLUETOOTH, WIFI, a ZIGBEE protocol, UWB, a RFID, a home Internet of things communications protocol technology, Sub-1G, and the like. This is not limited in this embodiment of this application.

For the wireless power supply apparatus 10, direction finding and beamforming processes are based on the antenna array 103 of the apparatus. Therefore, this embodiment of this application further provides an antenna array applied to the wireless power supply apparatus. The following describes the antenna array.

Still refer to the antenna array shown in FIG. 5.

The antenna array 103 provided in this embodiment of this application includes a first antenna element and a second antenna element.

The first antenna element is configured to perform data communication with the terminal, and is further configured to send the direction finding signal and receive the power supply request signal. The first antenna element in the figure is an antenna 9.

The second antenna element is an antenna array, and is configured to send the direction finding signal and transmit the beamformed electromagnetic waves.

The second antenna element in the figure is an antenna 1 to an antenna 8.

In some other embodiments, the first antenna element may include a plurality of antennas, and the second antenna element may include another quantity of antennas. This is not limited in this embodiment of this application.

An example in which communication between the apparatus and the terminal is performed by using the BLUETOOTH technology is still used below to describe a working principle of the apparatus antenna array.

The wireless power supply apparatus 10 sends a direction finding signal including a CTE to the terminal. In this case, the wireless power supply apparatus 10 switches between transmit antennas based on a preset order. The terminal 20 receives the direction finding signal.

After receiving the direction finding signal that includes the CTE and that is sent by the apparatus 10, the terminal 20 performs I/Q sampling during the CTE, determines phase information by using I/Q samples, and then performs direction finding calculation to determine the direction information.

The apparatus antenna array 103 shown in FIG. 5 uses a single-band antenna, that is, a frequency band is shared by data communication and electromagnetic wave transmission (power transmission).

In another possible implementation, the apparatus antenna array 103 uses a multi-band antenna, that is, different frequency bands are respectively used for data communication and power supply. Because data communication and signal-based direction finding functions are not affected when the multi-band antenna transmits energy, the multi-band antenna array may not include the first antenna element separately disposed, and functions of the first antenna element may be implemented by the second antenna element.

The following describes an implementation of the terminal antenna 203.

In a possible implementation, the antenna 203 of the terminal includes a third antenna element and a fourth antenna element.

The third antenna element is configured to perform data communication with the apparatus 10, receive the direction finding signal, and send the power supply request signal.

For example, when the terminal 20 is a sensor device, the third antenna element may transmit, to the apparatus, measurement data obtained by the terminal or data obtained after the measurement data is processed. The third antenna element may further transmit other data. This is not limited in this embodiment of this application.

The fourth antenna element is configured to transmit, to the energy collection module 202, the energy of the electromagnetic waves transmitted by the apparatus.

The third antenna element and the fourth antenna element may each be one antenna.

In another possible implementation, the antenna 203 may be a separate antenna, and the terminal controller 201 switches a working state of the antenna 203 in a time division multiplexing manner.

In an example, the terminal controller 201 controls the antenna 203 to be in a data transmission state, so that the antenna 203 receives the direction finding signal and sends the power supply request signal; and after the response signal transmitted by the apparatus 10 is received, controls the antenna 203 to be in a power receiving state, so that the antenna 203 transmits, to the energy collection module 202, the energy of the received electromagnetic waves transmitted by the apparatus 10.

When the antenna array 103 uses a multi-band antenna, the antenna 203 may be correspondingly a multi-band antenna. The antenna 203 uses different frequency bands to perform data communication and electromagnetic wave energy receiving. In this case, the antenna 203 may be one antenna.

When the antenna array 103 uses a multi-band antenna, the terminal antenna 203 may alternatively use a plurality of single-band antennas. In this case, a quantity of the single-band antennas of the terminal is the same as a quantity of frequency bands of the apparatus antenna array 103, and each single-band antenna of the terminal corresponds to one frequency band used by the apparatus antenna array 103.

For the wireless power receiving terminal 20, electric energy required for power-on may be completely provided by the apparatus 10, or may be provided by an external auxiliary power supply.

In some embodiments, the wireless power receiving terminal 20 is not connected to an external auxiliary power supply, and electric energy required for power-on is provided by the wireless power supply apparatus 10. That is, the apparatus controller 101 is further configured to control, before the direction of the terminal 20 is known, the device 10 to transmit electromagnetic waves at different azimuth angles and elevation angles.

In a possible implementation, the wireless power supply apparatus 10 may be controlled to perform blind sweep every preset period, to provide electric energy required for power-on to a newly added terminal 20.

In another possible implementation, the wireless power supply apparatus 10 may be further connected to a control device, for example, a mobile terminal or a computer. When a user adds a new terminal 20 to power supply coverage of the wireless power supply apparatus 10, the user may instruct, by using the control device, the wireless power supply apparatus 10 to perform blind sweep, to provide electric energy required for power-on to the newly added terminal 20.

In still another possible implementation, the wireless power supply apparatus 10 may alternatively perform blind sweep during each power-on. When a user adds a new terminal 20 to the power supply coverage of the wireless power supply apparatus 10, the wireless power supply apparatus 10 may be re-powered on to trigger blind sweep, so as to provide electric energy required for power-on to the newly added terminal 20.

In an example, blind sweep of the apparatus 10 may alternatively be triggered in other manners, which are not described in this embodiment of this application one by one herein.

In conclusion, the wireless power receiving terminal provided in this embodiment of this application has a direction finding function. The terminal may determine the direction information representing the relative position relationship between the terminal and the apparatus, and send the power supply request signal including the direction information to the apparatus, so that the apparatus determines the electromagnetic wave transmission direction by using the direction information. Then, the beamforming module aggregates the energy of the electromagnetic waves corresponding to the plurality of radio frequency signals to the transmission direction, and the apparatus antenna array transmits the beamformed electromagnetic waves, to supply power to the terminal. The terminal can actively determine the direction of the terminal relative to the apparatus, and after the direction of the terminal relative to the apparatus changes, the terminal may re-determine the direction, to improve efficiency of wireless power supply of the apparatus, thereby avoiding a manual measurement operation, and facilitating deployment. In addition, when the controller of the apparatus determines, by using the obtained direction information, that there are a plurality of transmission directions, the beamforming module may further concentrate the energy of the electromagnetic waves corresponding to the plurality of radio frequency signals to the plurality of transmission directions, that is, the apparatus further supports simultaneous power supply for a plurality of terminals.

Embodiment 5

Based on the wireless power supply apparatus and terminal provided in the foregoing embodiments, this embodiment of this application further provides a wireless power supply system. The following describes the wireless power supply system with reference to an accompanying drawing.

Figure 11:
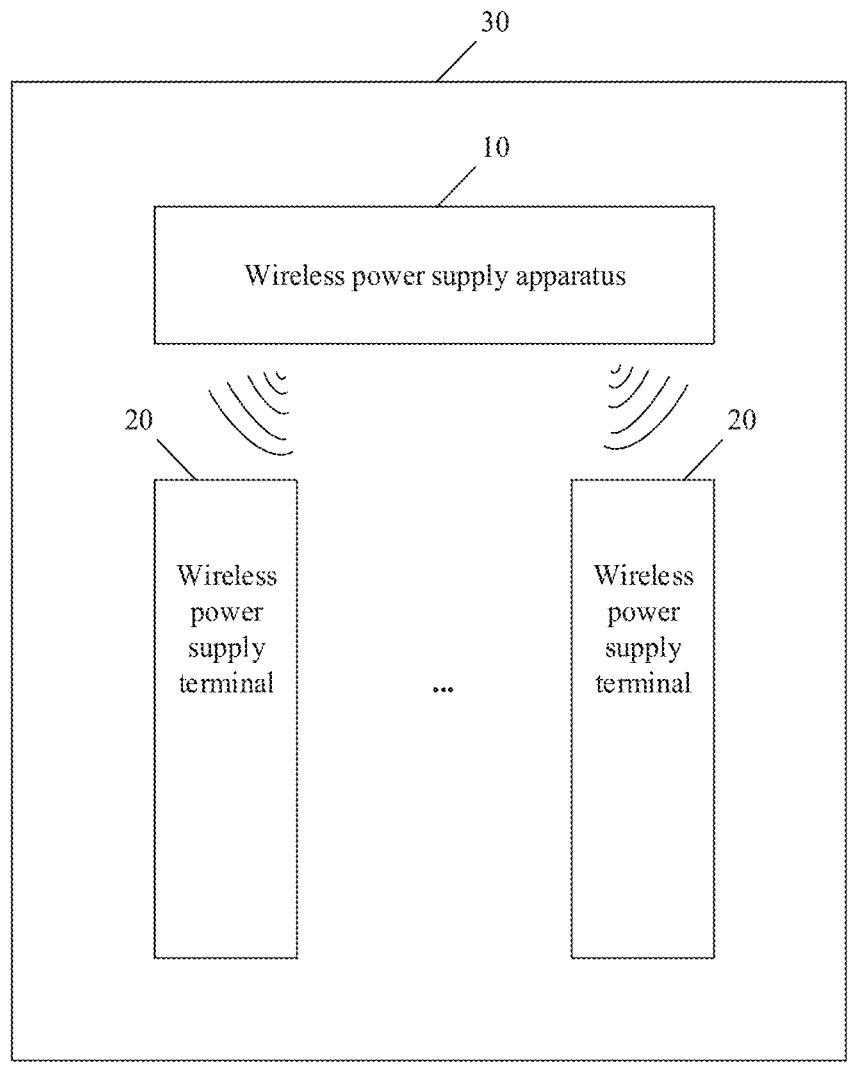
FIG. 11 is a schematic diagram of a wireless power supply system according to an embodiment of this application.

FIG. 11 is a schematic diagram of the wireless power supply system according to an embodiment of this application.

The wireless power supply system 30 includes a wireless power supply apparatus 10 and at least one wireless power receiving terminal 20.

For specific descriptions of the wireless power supply apparatus 10 and terminal 20, refer to the foregoing embodiments. Details are not described herein again in this embodiment of this application.

In a possible implementation, the wireless power supply apparatus includes an apparatus controller, a beamforming module, and an antenna array. When direction finding information in a direction finding signal sent by the wireless power receiving terminal is obtained, the apparatus controller determines an electromagnetic wave transmission direction, and transmits information about the transmission direction to the beamforming module. The beamforming module generates a plurality of radio frequency signals, and aggregates energy of electromagnetic waves corresponding to the plurality of radio frequency signals to the transmission direction. The antenna array is configured to receive the direction finding signal and transmit the electromagnetic waves. In this case, the wireless power receiving terminal includes a terminal antenna, an energy collection module, and a terminal controller. The terminal controller is configured to control the terminal antenna to send the direction finding signal including the direction finding information to the wireless power supply apparatus. The terminal antenna is configured to send the direction finding signal, and transmit, to the energy collection module, energy of the electromagnetic waves transmitted by the apparatus. The energy collection module is configured to collect and store the energy of the electromagnetic waves.

The apparatus can actively determine the direction of the terminal, and after the direction of the terminal relative to the apparatus changes, the apparatus may re-determine the direction, to improve efficiency of wireless power supply for the terminal, thereby avoiding a manual measurement operation, and facilitating deployment. In addition, the controller of the apparatus may further determine directions of a plurality of terminals, so that the beamforming module concentrates the energy of the electromagnetic waves corresponding to the plurality of radio frequency signals to a plurality of transmission directions, that is, the apparatus further supports simultaneous power supply for the plurality of terminals.

In another possible implementation, the apparatus controller of the wireless power supply apparatus controls the apparatus to send a direction finding signal to the wireless power receiving terminal, obtains direction information in a power supply request signal sent by the terminal, determines an electromagnetic wave transmission direction by using the direction information, and transmits information about the transmission direction to the beamforming module. The direction information represents a relative position relationship between the terminal and the apparatus. The beamforming module is configured to generate a plurality of radio frequency signals, and aggregate energy of electromagnetic waves corresponding to the plurality of radio frequency signals to the transmission direction. The apparatus antenna array is configured to send the direction finding signal, receive the power supply request signal, and transmit the electromagnetic waves. The terminal controller of the terminal is configured to, when direction finding information in the direction finding signal sent by the apparatus is obtained, control the terminal to send, to the apparatus, the power supply request signal that carries the direction information. The direction information represents a relative position relationship between the terminal and the apparatus. The terminal antenna is configured to receive the direction finding signal, send the power supply request signal, and transmit, to the energy collection module, energy of the electromagnetic waves transmitted by the apparatus. The energy collection module is configured to collect and store the energy of the electromagnetic waves.

The wireless power receiving terminal has a direction finding function. The terminal may determine the direction information representing the relative position relationship between the terminal and the apparatus, and send the power supply request signal including the direction information to the apparatus, so that the apparatus determines the electromagnetic wave transmission direction by using the power supply request signal. After a direction of the terminal relative to the apparatus changes, the terminal may re-determine the direction, to improve efficiency of wireless power supply of the apparatus, thereby avoiding a manual measurement operation, and facilitating deployment. In addition, when the controller of the apparatus determines that there is a plurality of transmission directions, the beamforming module may further concentrate the energy of the electromagnetic waves corresponding to the plurality of radio frequency signals to the plurality of transmission directions, that is, the apparatus further supports simultaneous power supply for a plurality of terminals.

Embodiment 6

Based on the wireless power supply apparatus provided in the foregoing embodiment, this embodiment of this application further provides a power supply device. The following describes the power supply device with reference to an accompanying drawing.

Figure 12:
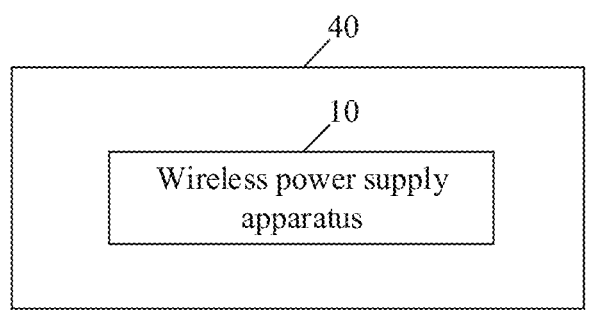
FIG. 12 is a schematic diagram of a power supply device according to an embodiment of this application.

FIG. 12 is a schematic diagram of a power supply device according to an embodiment of this application.

The power supply device 40 includes a wireless power supply apparatus 10, and the wireless power supply apparatus 10 is configured to perform wireless power supply for a wireless power receiving terminal.

For a specific implementation and a working principle of the wireless power supply apparatus 10, refer to the foregoing embodiment. Details are not described herein again in this embodiment of this application.

In conclusion, because the power supply device 40 in this application includes the wireless power supply apparatus 10, efficiency of wireless power supply for the terminal is improved, cabling is simplified, and deployment is facilitated. Moreover, the power supply device may be applied to a scenario in which a battery is not suitable for supplying power to a terminal, thereby avoiding periodic replacement of a terminal battery. In addition, the power supply device may be mounted in a plurality of manners, for example, ceiling mounting and wall mounting. This is not limited in this embodiment of this application. The apparatus further supports simultaneous power supply for a plurality of terminals.

Embodiment 7

Based on the wireless power receiving terminal provided in the foregoing embodiment, this embodiment of this application further provides a power receiving device. The power receiving device includes a wireless power receiving terminal. The power receiving device is a low-power device. In some embodiments, the power receiving device may be a low-power indicator, buzzer, or the like. In some other embodiments, the power receiving device is a low-power sensor.

Figure 13:
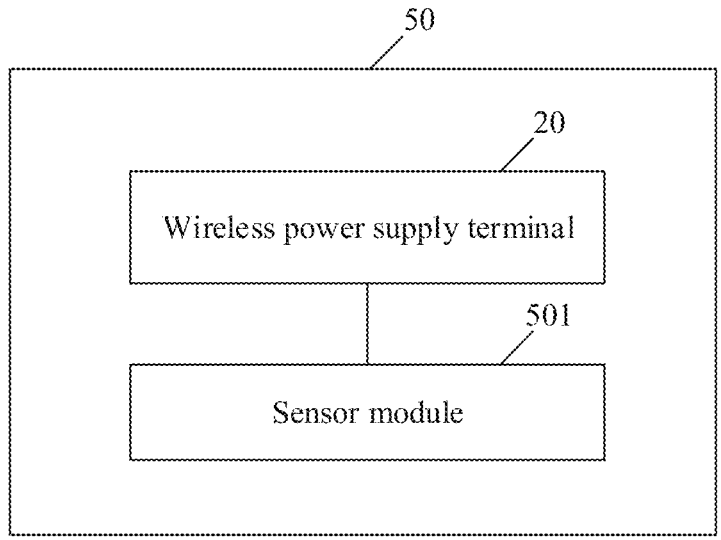
FIG. 13 is a schematic diagram of a sensor device according to an embodiment of this application.

FIG. 13 is a schematic diagram of a sensor device according to an embodiment of this application.

The sensor device 50 includes a wireless power receiving terminal 20 and a sensor module 501.

For a specific implementation and a working principle of the wireless power receiving terminal 20, refer to the foregoing embodiment. Details are not described herein again in this embodiment of this application. An energy collection module in the wireless power receiving terminal 20 is configured to supply power to the sensor module 501.

The sensor module 501 is configured to sense measured information, and convert, based on a specific rule, sensed information into an electrical signal or information in another required form for output.

The sensor device 50 may be a temperature sensor, a humidity sensor, a water leakage sensor, a door status sensor, an infrared sensor, or the like. This is not limited in this embodiment of this application.

In conclusion, a wireless power supply apparatus may perform wireless power supply for the sensor device 50 provided in this embodiment of this application, which simplifies cabling, facilitates deployment, avoids battery replacement, and can work normally even in a scenario in which a battery is not suitable for supplying power.

Embodiment 8

This embodiment of this application further provides a control method for wireless power supply, to control a wireless power supply system, so that a wireless power supply apparatus supplies power to a wireless power receiving terminal. The following describes the method with reference to an accompanying drawing.

The following first describes a control method based on an angle-of-arrival direction finding technology.

Figure 14:
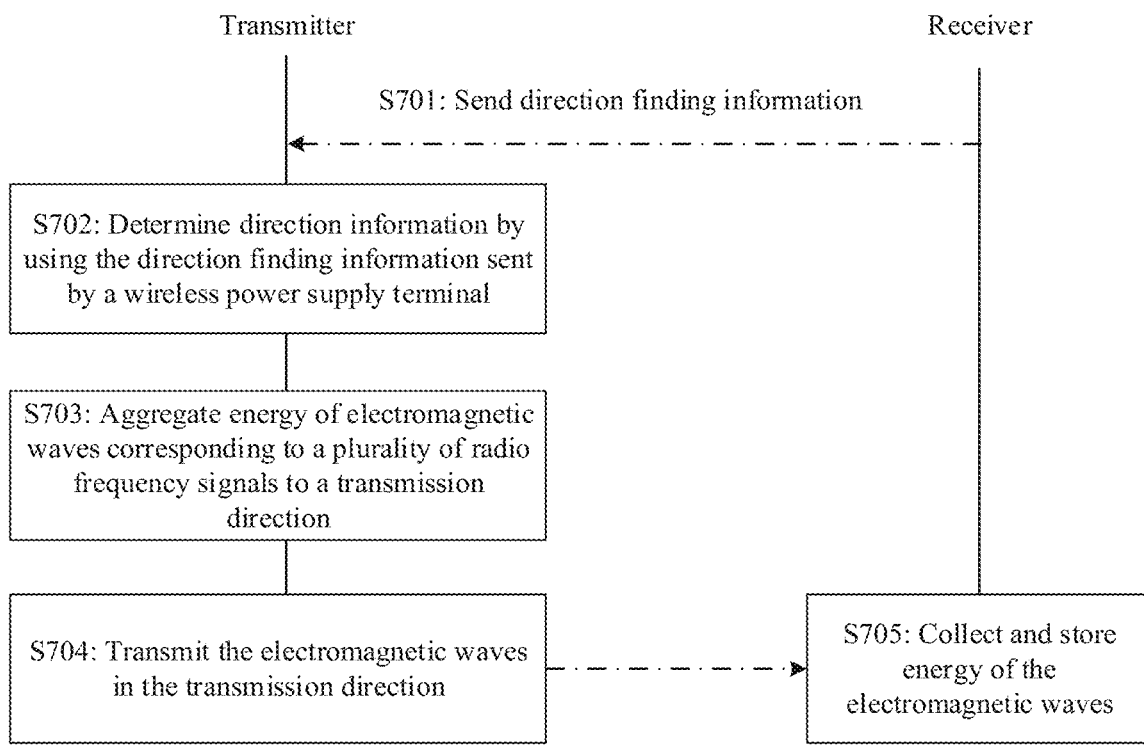
FIG. 14 is a flowchart of a control method for wireless power supply according to an embodiment of this application.

FIG. 14 is a flowchart of a control method for wireless power supply according to an embodiment of this application.

The method includes the following steps.

S701: Send direction finding information.

In some embodiments, the direction finding information may be sent based on a preset period. In this case, a function of the direction finding information is to enable the apparatus to periodically obtain a status of the terminal, for example, determine whether the terminal normally performs communication connection. In addition, a controller of the apparatus may be further enabled to periodically perform direction finding and positioning, to adjust or calibrate a direction of the terminal relative to the apparatus, so as to improve efficiency of wireless power supply for the terminal.

S702: Determine an electromagnetic wave transmission direction by using the direction finding information sent by the wireless power receiving terminal.

In an example, the transmission direction is determined based on phase information and wavelength information that are determined by the direction finding information and a relative position relationship between antennas included in an antenna array of the apparatus. The relative position relationship between the antennas includes a distance between the antennas and a relative direction between the antennas, and may be determined in advance.

In some embodiments, after obtaining the direction finding information for a preset time or after determining the transmission direction, the apparatus may further send a response signal to the wireless power receiving terminal. The response signal is used as a feedback signal of the apparatus, and may instruct the terminal to stop further sending the direction finding information. When an antenna of the terminal uses a single-band antenna, after receiving the response signal, the terminal controls the antenna of the terminal to switch from a data transmission state to a power receiving state.

S703: Aggregate energy of electromagnetic waves corresponding to a plurality of radio frequency signals to the transmission direction.

In some embodiments, there is no battery inside the wireless power receiving terminal, or there is a battery inside the terminal but the battery does not store power, and electric energy required for power-on of the terminal is provided by the wireless power supply apparatus. That is, the apparatus transmits electromagnetic waves at different azimuth angles and elevation angles, to sweep within power supply coverage of the apparatus, so as to provide electric energy required for power-on of the terminal.

In a possible implementation, the wireless power supply apparatus may be controlled to perform blind sweep every preset period, to provide electric energy required for power-on to a newly added terminal.

In another possible implementation, the wireless power supply apparatus may be further connected to a control device, for example, a mobile terminal or a computer. When a user adds a new terminal to the power supply coverage of the wireless power supply apparatus, the user may instruct, by using the control device, the wireless power supply apparatus to perform blind sweep, to provide electric energy required for power-on to the newly added terminal.

In still another possible implementation, the wireless power supply apparatus may alternatively perform blind sweep during each power-on. When a user adds a new terminal to the power supply coverage of the wireless power supply apparatus, the wireless power supply apparatus may be re-powered on to trigger blind sweep, so as to provide electric energy required for power-on to the newly added terminal.

S704: Transmit the electromagnetic waves in the transmission direction.

The apparatus is controlled to transmit beamformed electromagnetic waves to the transmission direction, to perform wireless power supply for the terminal.

S705: Collect and store energy of the electromagnetic waves.

In conclusion, with the method provided in this embodiment of this application, when the direction finding information sent by the wireless power receiving terminal is obtained, the apparatus determines the electromagnetic wave transmission direction. The transmission direction represents a direction of the terminal relative to the apparatus. After the direction of the terminal relative to the apparatus changes, the apparatus may re-determine the direction, to adjust the electromagnetic wave transmission direction, so as to improve efficiency of wireless power supply for the terminal, thereby avoiding a manual measurement operation, and facilitating deployment. In addition, the apparatus may further determine directions of a plurality of terminals, and concentrate the energy of the electromagnetic waves to a plurality of transmission directions, that is, the apparatus further supports simultaneous power supply for the plurality of terminals.

The following describes a control method based on an angle-of-departure direction finding technology.

Figure 15:
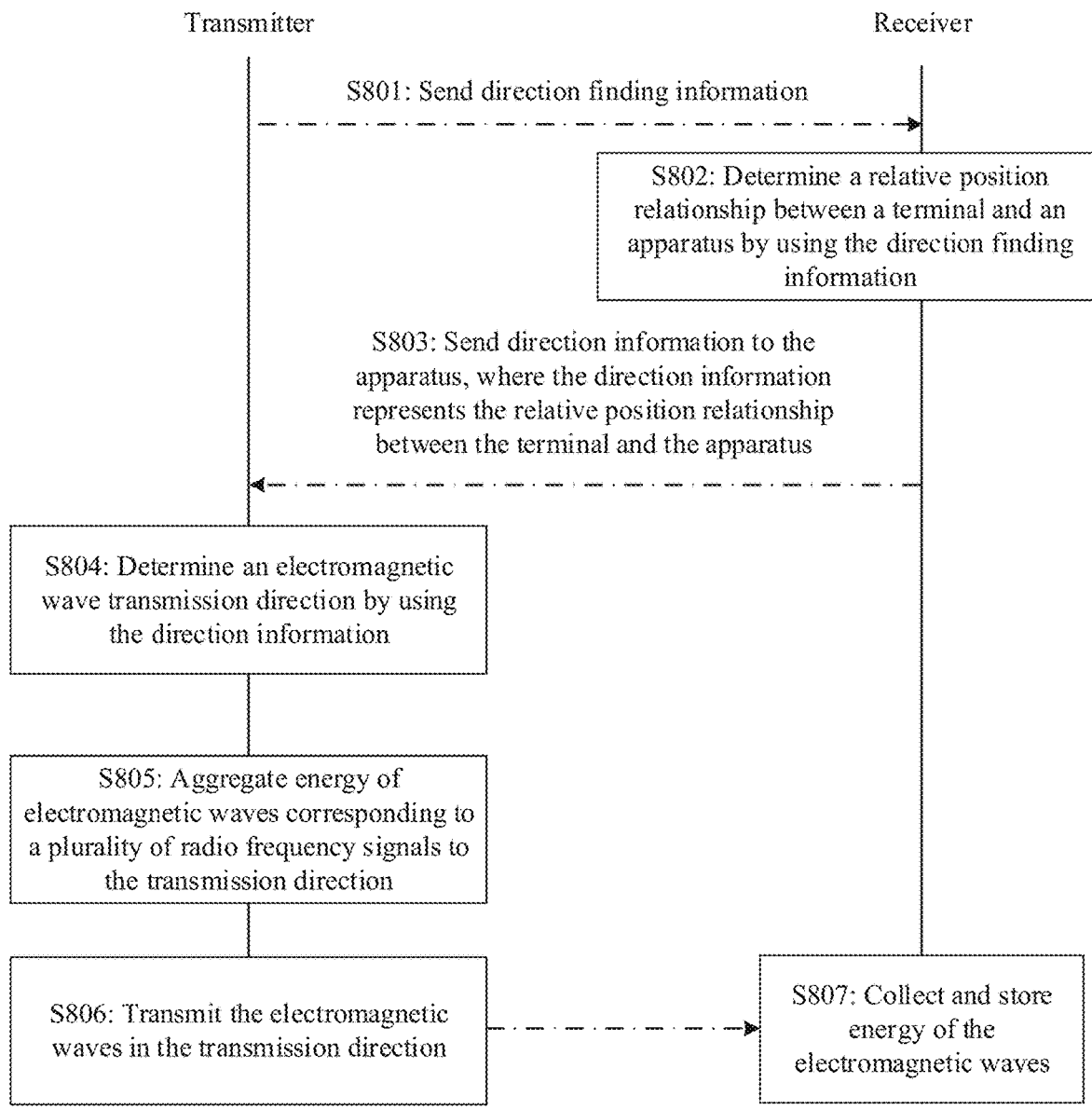
FIG. 15 is a flowchart of another control method for wireless power supply according to an embodiment of this application.

FIG. 15 is a flowchart of a control method for wireless power supply according to an embodiment of this application.

In this case, the wireless power receiving terminal performs direction finding. The method includes the following steps.

S801: Send direction finding information.

The wireless power supply apparatus may send the direction finding information based on a preset period, so that a controller of the terminal periodically performs direction finding and positioning, to adjust or calibrate a direction of the terminal relative to the apparatus, so as to improve efficiency of wireless power supply for the terminal.

S802: Determine a relative position relationship between the terminal and the apparatus by using the direction finding information.

In an example, the direction information is determined based on phase information and wavelength information that are determined by the direction finding information and a relative position relationship between antennas included in an antenna array. The relative position relationship between the antennas includes a distance between the antennas and a relative direction between the antennas, and may be determined in advance.

S803: Send the direction information to the apparatus, where the direction information represents a relative position relationship between the terminal and the apparatus.

S804: Determine an electromagnetic wave transmission direction by using the direction information.

In some embodiments, after determining the electromagnetic wave transmission direction, the apparatus may further send a response signal to the wireless power receiving terminal. The response signal is used as a feedback signal of the apparatus. When an antenna of the terminal uses a single-band antenna, after receiving the response signal, the terminal controls the antenna of the terminal to switch from a data transmission state to a power receiving state.

S805: Aggregate energy of electromagnetic waves corresponding to a plurality of radio frequency signals to the transmission direction.

Further, before the direction of the terminal is known, electromagnetic waves are transmitted at different azimuth angles and elevation angles.

In some embodiments, there is no battery inside the wireless power receiving terminal, or there is a battery inside the terminal but the battery does not store power, and electric energy required for power-on of the terminal is provided by the wireless power supply apparatus. That is, the apparatus transmits electromagnetic waves at different azimuth angles and elevation angles, to sweep within power supply coverage of the apparatus, so as to provide electric energy required for power-on of the terminal.

In a possible implementation, the wireless power supply apparatus may be controlled to perform blind sweep every preset period, to provide electric energy required for power-on to a newly added terminal.

In another possible implementation, the wireless power supply apparatus may be further connected to a control device, for example, a mobile terminal or a computer. When a user adds a new terminal to the power supply coverage of the wireless power supply apparatus, the user may instruct, by using the control device, the wireless power supply apparatus to perform blind sweep, to provide electric energy required for power-on to the newly added terminal.

In still another possible implementation, the wireless power supply apparatus may alternatively perform blind sweep during each power-on. When a user adds a new terminal to the power supply coverage of the wireless power supply apparatus, the wireless power supply apparatus may be re-powered on to trigger blind sweep, so as to provide electric energy required for power-on to the newly added terminal.

S806: Transmit the electromagnetic waves in the transmission direction.

The apparatus is controlled to transmit beamformed electromagnetic waves to the transmission direction, to perform wireless power supply for the terminal.

S807: Collect and store energy of the electromagnetic waves.

The step division in the foregoing method embodiments is merely for ease of description. Persons skilled in the art may make appropriate modifications to the foregoing steps to obtain another equivalent replacement manner, without departing from the spirit and scope of the technical solutions of the embodiments of this application.

In conclusion, with the method provided in this embodiment of this application, the terminal may determine the direction information representing the relative position relationship between the terminal and the apparatus, and send the direction information to the apparatus, so that the apparatus determines the electromagnetic wave transmission direction by using the direction information. After the direction of the terminal relative to the apparatus changes, the terminal may re-determine the direction, so that the apparatus can correspondingly re-determine the electromagnetic wave transmission direction, to improve efficiency of wireless power supply of the apparatus, thereby avoiding a manual measurement operation, and facilitating deployment. In addition, when the controller of the apparatus determines that there are a plurality of transmission directions, the beamforming module may further concentrate the energy of the electromagnetic waves corresponding to the plurality of radio frequency signals to the plurality of transmission directions, that is, the apparatus further supports simultaneous power supply for a plurality of terminals.

Embodiment 9

This embodiment of this application further provides a chip, applied to or implemented as a wireless power supply apparatus. The chip includes one or more processors and an interface. The interface is configured to receive code instructions and transmit the code instructions to the processor. The processor is configured to run the code instructions, to enable the wireless power supply apparatus to perform the method in the foregoing method embodiment.

This embodiment of this application further provides another chip, applied to or implemented as a wireless power receiving terminal. The chip includes one or more processors and an interface. The interface is configured to receive code instructions and transmit the code instructions to the processor. The processor is configured to run the code instructions, to enable the wireless power receiving terminal to perform the method in the foregoing method embodiment.

The methods described in the foregoing embodiments may be all or partially implemented by using software, hardware, firmware, or any combination thereof. When the software is used to implement the embodiments, all or some of the embodiments may be implemented in a form of a program product. The instructions may be stored in a readable storage medium, or transmitted from one readable storage medium to another readable storage medium. The usable medium may be a magnetic medium (for example, a floppy disk, a hard disk, or a magnetic tape), an optical medium (for example, a digital video disk (DVD)), a semiconductor medium (for example, a solid-state drive), or the like.

The apparatus controller and the terminal controller in this embodiment of this application may be an application-specific integrated circuit (ASIC), a programmable logic device (PLD), a digital signal processor (DSP), or a combination thereof. The PLD may be a complex programmable logic device (CPLD), a field-programmable gate array (FPGA), a general array logic (GAL), or any combination thereof. This is not limited in this embodiment of this application.

It should be understood that, in this application, "at least one" means one or more, and "a plurality of" means two or more. The term "and/or" is used to describe an association relationship between associated objects, and represents that three relationships may exist. For example, "A and/or B" may represent the following three cases. Only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent a, b, c, "a and b", "a and c", "b and c", or "a, b, and c", where a, b, and c may be singular or plural.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A wireless power supply apparatus, comprising:
   a controller configured to:
      determine a transmission direction of an electromagnetic wave based on direction finding information; and
      transmit transmission direction information indicating the transmission direction;
   a beamforming apparatus coupled to the controller and configured to:
      receive the transmission direction information from the controller; and
      aggregate energy of electromagnetic waves corresponding to a plurality of radio frequency signals to the transmission direction responsive to receiving the transmission direction information; and
   an antenna array coupled to the controller and configured to:
      receive the direction finding information from the controller; and
      transmit electromagnetic waves in the transmission direction based on the direction finding information.

2. The wireless power supply apparatus of claim 1, wherein the controller is further configured to:
   determine both phase information and wavelength information based on the direction finding information and a relative position relationship between antennas comprised in the antenna array; and
   determine the transmission direction based on the phase information and the wavelength information.

3. The wireless power supply apparatus of claim 1, further comprising a direction finding apparatus and a radio frequency switching apparatus, wherein the controller is further configured to:
   control the radio frequency switching apparatus to be in a signal transmission state; to cause the direction finding apparatus to receive a direction finding signal; and
   control, after determining the transmission direction, the radio frequency switching apparatus to switch to a power transmission state to cause the beamforming apparatus to transmit the electromagnetic waves using the antenna array; and wherein the direction finding apparatus is configured to:
    obtain the direction finding information in the direction finding signal; and
    transmit the direction finding information to the controller.

4. The wireless power supply apparatus of claim 3, wherein the controller is further configured to control, after determining the transmission direction, the wireless power supply apparatus to send a response signal to a wireless power receiving terminal.

5. The wireless power supply apparatus of claim 3, wherein the antenna array comprises:
    a first antenna element a configured to:
        perform data communication, and
        trigger the second antenna element to start to receive the direction finding signal in response to receiving the direction finding signal at the direction finding apparatus; and
    wherein the second antenna element is an antenna array and that is configured to:
        receive the direction finding signal; and
        transmit the electromagnetic waves.

6. The wireless power supply apparatus of claim 5, wherein the first antenna element and the second antenna element are multi-band antennas.

7. The wireless power supply apparatus of claim 1, wherein the controller is further configured to control, before determining the transmission direction, the wireless power supply apparatus to transmit electromagnetic waves at different azimuth angles and elevation angles.

8. The wireless power supply apparatus of claim 1, wherein the wireless power supply apparatus comprises a short-range wireless communications technology.

9. The wireless power supply apparatus of claim 8, wherein the short-range wireless communications technology is one of BLUETOOTH, Wi-Fi, ultra-wideband (UWB), radio frequency identification (RFID) technology, a Zigbee protocol, a home Internet of things communications protocol technology Thread, or Sub-1 Gigahertz technology (Sub-1G).

10. A wireless power receiving terminal, comprising:
    an antenna configured to:
        receive electromagnetic waves,
        send direction finding information; and
        transmit energy of the electromagnetic waves;
    an energy collection apparatus coupled to the antenna and configured to:
        receive the energy of the electromagnetic waves; and
        store the energy of the electromagnetic waves; and
    a controller configured to control the antenna to send the direction finding information.

11. The wireless power receiving terminal of claim 10, wherein the controller is further configured to control the wireless power receiving terminal to send the direction finding information based on a preset period.

12. The wireless power receiving terminal of claim 10, wherein the wireless power receiving terminal further comprises a radio frequency apparatus, and wherein the radio frequency apparatus is configured to send the direction finding information using the antenna.

13. The wireless power receiving terminal of claim 10, wherein the antenna comprises;
    a third antenna element configured to:
        perform data communication; and
        send a direction finding signal, wherein the direction finding signal comprises the direction finding information; and
    a fourth antenna element configured to transmit the energy of the electromagnetic waves to the energy collection apparatus.

14. The wireless power receiving terminal of claim 10, wherein the controller is further configured to:
    control the antenna to be in a data transmission state to cause the antenna to send a direction finding signal, wherein the direction finding signal comprises the direction finding information; and
    control the antenna to be in a power receiving state to cause the antenna to obtain the energy of the electromagnetic waves.

15. The wireless power receiving terminal of claim 10, wherein the antenna is a multi-band antenna.

16. The wireless power receiving terminal of claim 10, wherein the wireless power receiving terminal is configured to use a short-range wireless communications technology.

17. The wireless power receiving terminal of claim 16, wherein the short-range wireless communications technology is one of Bluetooth, Wi-Fi, ultra-wideband (UWB), radio frequency identification (RFID) technology, a Zigbee protocol, a home Internet of things (IoT) communications protocol technology Thread, or Sub-1G.

18. The wireless power receiving terminal of claim 10, wherein the wireless power receiving terminal further comprises a sensor, and wherein the energy collection apparatus is further configured to supply power to the sensor.

19. A wireless power supply system, comprising:
    a wireless power supply apparatus, comprising:
        a first controller configured to:
            determine a transmission direction of an electromagnetic wave based on direction finding information; and
            transmit transmission direction information indicating the transmission direction;
        a beamforming apparatus coupled to the first controller and configured to:
            receive the transmission direction information from the first controller;
            aggregate energy of electromagnetic waves corresponding to a plurality of radio frequency signals to the transmission direction responsive to receiving the transmission direction information; and
        an antenna array couple to the first controller and configured to:
            receive the direction finding information from the first controller; and
            transmit the electromagnetic waves in the transmission direction based on the direction finding information;
    a wireless power receiving terminal, comprising:
        an antenna configured to:
            send the direction finding information; and
            transmit the energy of the electromagnetic waves;
        an energy collection apparatus coupled to the antenna and configured to:
            receive the energy of the electromagnetic waves; and
            store the energy of the electromagnetic waves; and
        a second controller configured to control the antenna to send the direction finding information waves.

20. The wireless power supply system of claim 19, wherein the first controller further configured to:
    determines phase information and wavelength information based on the direction finding information and a relative position relationship between antennas comprised in the antenna array; and determine the transmission direction based on the phase information and the wavelength information.

\* \* \* \* \*

UNITED STATES PATENT AND TRADEMARK OFFICE
CERTIFICATE OF CORRECTION

PATENT NO. : 11,923,693 B2
APPLICATION NO. : 17/726761
DATED : March 5, 2024
INVENTOR(S) : Yuan Cheng and Wei Shui It is certified that error appears in the above-identified patent and that said Letters Patent is hereby corrected as shown below:

On the Title Page

(56) References Cited, U.S. Patent Documents: "2018/0006508 A1 1/2018 Jeki et al." should read "2018/0006508 A1 1/2018 Ueki et al"

In the Claims

Claim 3, Column 32, Line 61: "state; to cause" should read "state to cause"

Claim 19, Column 34, Line 61: "information waves." should read "information."

Signed and Sealed this
Thirtieth Day of April, 2024

Katherine Kelly Vidal
*Director of the United States Patent and Trademark Office*